(12) United States Patent
Itoh et al.

(10) Patent No.: US 7,729,514 B2
(45) Date of Patent: Jun. 1, 2010

(54) DISPLAY DEVICE, VEHICLE, METHOD FOR DISPLAYING, PROGRAM FOR DISPLAYING AND RECORDING MEDIUM OF SAME

(75) Inventors: Megumi Itoh, Nara (JP); Toshiya Takahashi, Soraku-gun (JP); Shinichirou Ota, Nara (JP); Aki Miake, Nara (JP); Takeshi Yamamoto, Soraku-gun (JP); Keiichiro Sato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 847 days.

(21) Appl. No.: 11/570,052

(22) PCT Filed: Jun. 2, 2005

(86) PCT No.: PCT/JP2005/010545

§ 371 (c)(1),
(2), (4) Date: Dec. 5, 2006

(87) PCT Pub. No.: WO2005/120881

PCT Pub. Date: Dec. 22, 2005

(65) Prior Publication Data

US 2008/0258892 A1    Oct. 23, 2008

(30) Foreign Application Priority Data

Jun. 7, 2004    (JP)    ............... 2004-169168

(51) Int. Cl.
*G06K 9/00*    (2006.01)

(52) U.S. Cl. ........................ 382/104; 382/106; 382/107

(58) Field of Classification Search ................. 382/100, 382/104, 106, 107, 187, 155; 358/520, 530; 345/7, 169; 359/13; 348/160, 762; 705/412; 379/106.6; 324/157; 340/441
See application file for complete search history.

(56) References Cited

U.S. PATENT DOCUMENTS 5,760,931 A * 6/1998 Saburi et al. ................... 359/13

(Continued)

FOREIGN PATENT DOCUMENTS

DE    100 08 211 A1    8/2001

(Continued)

OTHER PUBLICATIONS

Official Communication issued in corresponding International Patent Application No. PCT/JP2005/010545, mailed Jul. 26, 2005.

(Continued)

*Primary Examiner*—Anh Hong Do
(74) *Attorney, Agent, or Firm*—Keating & Bennett, LLP

(57) ABSTRACT

A display section displays a speedometer having a substantially circular shape on an outer circumference of which a speed scale is provided. Then, that point on the outer circumference of the speedometer which indicates a speed at a moment is calculated. Further a speed that is attained at a given time period (e.g. 0.5 second) after the moment if the speed is increased at an acceleration at the moment is calculated. An arc-shaped pointer is displayed, the arc-shaped pointer passing (i) the calculated point of the speed scale, (ii) a middle point between the calculated point of the speed scale and a center of the speedometer, and (iii) the center of the speedometer. With this arrangement, a display device displaying the speedometer allows a driver to easily recognize the speed and an amount of a change therein (i.e. acceleration).

20 Claims, 13 Drawing Sheets

U.S. PATENT DOCUMENTS

| | | |
|---|---|---|
| 6,721,634 B1 | 4/2004 | Hauler et al. |
| 6,809,724 B1 * | 10/2004 | Shiraishi et al. ............. 345/169 |
| 7,064,678 B2 * | 6/2006 | Kim et al. .............. 340/870.02 |

FOREIGN PATENT DOCUMENTS

| | | |
|---|---|---|
| DE | 101 09 905 A1 | 8/2002 |
| JP | 57-110984 A | 7/1982 |
| JP | 63-144690 U | 9/1988 |
| JP | 02-124559 U | 10/1990 |
| JP | 08-159815 A | 6/1996 |
| JP | 10-297318 A | 11/1998 |
| JP | 11-020507 A | 1/1999 |
| JP | 2003-262542 A | 9/2003 |
| JP | 2003-315108 A | 11/2003 |
| WO | 03/057523 A1 | 7/2003 |
| WO | 03/074327 A1 | 9/2003 |

OTHER PUBLICATIONS

Official communication issued in counterpart European Application No. 05748470.1, mailed on Dec. 4, 2008.

* cited by examiner

DISPLAY DEVICE, VEHICLE, METHOD FOR DISPLAYING, PROGRAM FOR DISPLAYING AND RECORDING MEDIUM OF SAME

BACKGROUND OF THE INVENTION

1. Field of the Invention

The present invention relates to a display device for displaying a value of a physical quantity and an extent of a change in the physical quantity, a vehicle provided with the display device, a method for displaying, a program for displaying, and a recording medium of the same.

2. Description of the Related Art

In general, a vehicle (transportation means) such as automobiles is provided with measuring sections for measuring a speed, a number of engine revolution (revolution speed), and the like, and meters such as a meter for speed (speedometer), a revolution speeder (tachometer), and the like.

Referring to reading of the meters, a driver can grasp a driving speed and the number of engine revolution (revolution speed) at a moment when the driver referred to the meters. This enables the driver to drive more appropriately.

Moreover, for example, Japanese Utility Model Publication, Jitsukaihei, 2-124559 (published on Oct. 15, 1990) discloses an acceleration display device, provided on a vehicle, so as to display acceleration measured by an acceleration sensor. The acceleration display device displays the acceleration in such a manner that an indicator extended in a radial direction from a center corresponds to an extent of the acceleration, where the center is an original point of coordinates.

A speedometer and tachometer, however, indicate a speed and revolution speed at the moment of reading: the speedometer and tachometer do not indicate extents of changes in the speed and the revolution speed. Therefore, the driver can grasp the extents of the changes, e.g., by feeling a change of scenery around a vehicle, a change in sound of engine, or other changes.

Moreover, in the art disclosed in Japanese Utility Model Publication No. 2-124559, the vehicle provided with the acceleration display device is provided with an acceleration meter (a display section for displaying the acceleration) in addition to the speedometer and tachometer.

This results in an increase in a number of the meters to be referred by the driver, thereby increasing a number of directions the driver looks to or a number of occasions the driver looks at any of the meters. This puts more burden on the driver and makes it difficult for the driver to recognize reading of each meter.

SUMMARY OF THE INVENTION

In view of the aforementioned problem, an object of the present invention is to provide a display device, a vehicle provided therewith, a display method, a display program, and a recording medium storing therein the same, each of which allows a user to easily recognize a physical value and an extent of a change therein.

In order to attain the object, a display device according to the present invention is provided with a display section for displaying an image; and a control section for controlling the image or images that are to be displayed on the display section, each of the image or images being a meter image for indicating a physical amount, and the control section causing the meter image to indicate, as well as the physical amount, an amount of a change in the physical amount per a given time period.

With this arrangement, the physical amount and the amount of the change in the physical amount per the given time period are displayed on the same meter image. This meter image allows the user to easily recognize the physical amount and the extent of the change therein.

The control section may change a shape of the meter image in order to indicate the amount of the change in the physical amount per the given time period.

With this arrangement, the physical amount and the amount of the change in the physical amount per the given time period are indicated by using the meter image and its shape. This allows the user to easily recognize the physical amount and the extent of the change therein by the meter image and its shape.

The meter image may be made up with a plurality of parts images, and the control section may change a shape or shapes of one or more of the parts images in order to indicate the amount of the change in the physical amount per the given time period.

With this arrangement, the physical amount and the amount of the change in the physical amount per the given time period are indicated by using the meter image(s) and the shape or shapes of parts images that are included in the meter image. This allows the user to easily recognize the physical amount and the extent of the change therein by the meter image(s) and the shape or shapes of parts images that are included in the meter image.

The control section may change a display area or display areas of one or more of the parts images in order to indicate the amount of the change in the physical amount per the given time period.

With this arrangement, the physical amount and the amount of the change in the physical amount per the given time period are indicated by using the meter image and display area or display areas of one or more of the parts images that are included in the meter image. This allows the user to easily recognize the physical amount and the extent of the change therein by the meter image and display area or display areas of the one or more of the parts images that are included in the meter image.

Furthermore, the meter image may include a pointer image for pointing a position that corresponds to the physical amount that is to be indicated, and the control section may change a shape of the pointer image in order to indicate the amount of the change in the physical amount per the given time period.

With this arrangement, the physical amount and the amount of the change in the physical amount per the given time period are indicated by using (i) the position pointed out by the pointer image included in the meter image, and (ii) the shape of the pointer image. This allows the user to easily recognize the physical amount and the extent of the change therein by (i) the position pointed out by the pointer image included in the meter image, and (ii) the shape of the pointer image. The shape of the pointer image may be changed by, for example, changing a curving state of the pointer image. In this case, the user can easily recognize the extent of the change therein by seeing the curving state of the pointer image. The pointer image is an image having a rod-like shape that is suitable for indicating a value. More specifically, the shape of the pointer image is similar to various kinds of pointers generally used for meters.

Moreover, at least one of the parts image may be a three dimension image that is at least partly displayed with three dimensions, and the control section may change a length of one of the three dimensions of the three dimension image in order to indicate the amount of the change in the physical amount per the given time period.

With this arrangement, the physical amount and the amount of the change in the physical amount per the given time period are indicated by using the meter image and the length of one of the three dimensions of the three dimension image included in the meter image. This allows the user to easily recognize the physical amount and the extent of the change therein by the meter image and the length of one of the three dimensions (e.g. a height) of the three dimension image included in the meter image.

Furthermore, the control section may change a color of at least part of the meter image in order to indicate the amount of the change in the physical amount per the given time period.

With this arrangement, the physical amount and the amount of the change in the physical amount per the given time period are indicated by using the meter image and the color of the at least part of the meter image. This allows the user to easily recognize the physical amount and the extent of the change therein by the meter image and the color of the at least part of the meter image.

Moreover, the meter image may be made up with a plurality of parts images, and the control section may change a color or colors of one or more of the parts images in order to indicate the amount of the change in the physical amount per the given time period.

With this arrangement, the physical amount and the amount of the change in the physical amount per the given time period are indicated by using the meter image and the color or colors of the one or more of the parts images. This allows the user to easily recognize the physical amount and the extent of the change therein by the meter image and the color or colors of the one or more of the parts images.

The control section may cause the meter images to respectively indicate the different physical amounts as well as the amounts of changes in the physical amounts per the given time period or the given time periods.

With this arrangement, plural kinds of physical amounts and the amounts of the changes in the physical amounts are displayed on the same meter image. This allows the user to easily recognize the plural kinds of physical amounts and the amounts of the changes in the physical amounts by the meter image.

The control section may cause the meter image or at least one of the meter images to solely indicate two or more physical amounts and amounts of changes in the physical amounts per a given time period or given time periods.

With this arrangement, plural kinds of physical amounts and the amounts of the changes in the physical amounts are displayed on the one meter image. This allows the user to easily recognize the plural kinds of physical amounts and the amounts of the changes in the physical amounts by looking at the one meter image.

Moreover, the meter image or at least one of the meter images may include a panel portion image, a pointer image, and a three dimension displaying image, the panel portion image being a background image in an interior portion of the meter image, the pointer image displayed on the panel portion image and rotating about a specific position, which acts as an axis of the pointer image, of the panel portion image, and the three dimension displaying image causing the panel portion image to be displayed with three dimensions; and the control section may change a point at which the pointer image points, a shape of the pointer image, a shape of the three-dimension displaying image, and a color of at least part of the meter image, in order to cause the meter image or at least one of the meter images to solely indicate two physical amounts and amounts of changes in the two physical amounts per a given time period or given time periods.

With this arrangement, the two physical amounts and the amounts of the changes in the two physical amounts are displayed on the one meter image. This allows the user to easily recognize the two physical amounts and the amounts of the changes in the two physical amounts by looking at the one meter image.

The display device may be provided with a physical amount measuring section for measuring the physical amount; and a change amount measuring section for measuring the amount of the change in the physical amount, the physical amount and the amount of the change indicated by the meter image being the physical amount and the amount of the change, which are respectively measured by the physical amount measuring section and the change amount measuring section.

With this arrangement, it is possible to display the physical amount and the amount of the change, which are respectively measured by the physical amount measuring section and the change amount measuring section. Therefore, the user can grasp the physical amount and the amount of the change at sight the physical amount and the amount of the change being respectively measured by the physical amount measuring section and the change amount measuring section.

In order to attain the object, a vehicle according to the present invention is provided with the display device having any of these arrangements.

With this arrangement, it is possible to display on the same meter the physical amount, and the amount of the change in the physical amount, which are necessary to be indicated for the vehicle. This allows the user to easily recognize the physical amount and the extent of the change in the physical amount.

The vehicle according to the present invention may be provided with a speed measuring section for measuring a speed, and an acceleration measuring section for measuring an amount of a change in the speed per a given time period, the physical amount and the amount of the change indicated by the meter image being the speed and the amount of the change in the speed, which are respectively measured by the speed measuring section and the acceleration measuring section.

This arrangement allows the user to easily recognize the speed of the vehicle and the amount of the change in the speed.

The vehicle according to the present invention may be provided with a revolution driving section for supplying a driving force to the vehicle; a revolution speed measuring section for measuring a revolution speed; and a revolution speed change amount measuring section for measuring an amount of the change in the revolution speed per a given time period, the physical amount and the amount of the change indicated by the meter image being the revolution speed and the amount of the change in the revolution speed, which are measured by the revolution speed measuring section and the revolution speed change amount measuring section.

This arrangement allows the user to easily recognize the revolution speed of the revolution driving means of the vehicle and the amount of the change in the revolution speed.

A display method according to the present invention includes displaying a meter image on a display section for displaying an image, the meter image indicating a physical amount, the meter image indicating, as well as the physical amount, an amount of a change in the physical amount per a given time period.

With this method, it is possible to display on the same meter image the physical amount and the amount of the change in the physical amount per the given time period. This allows the user to easily recognize the physical amount and the extent of the change therein by referring to the meter image.

Furthermore, a display method according to the present invention may include indicating, on a display device mounted on a vehicle, a speed of the vehicle, the speed indicated by using a speed meter image, which indicates, as well as the speed, an amount of a change in the speed per a given time period.

With this method, it is possible to display on the speedometer image the speed and the amount of the change in the speed per the given time period. This allows the user to easily recognize the speed and the extent of the change therein by referring to the speedometer image.

Furthermore, a display method according to the present invention may include indicating, on a display device mounted on a vehicle, a revolution speed of a revolution driving section for supplying a driving force to the vehicle, the revolution speed indicated by using a tachometer image, which indicates, as well as the revolution speed, an amount of a change in the revolution speed per a given time period.

With this method, it is possible to display on the tachometer image the revolution speed of the revolution driving section and the amount of the change in the revolution speed per the given time period. This allows the user to easily recognize the revolution speed and the extent of the change therein by referring to the tachometer image.

In order to attain the object, a display program of the present invention causes a computer, which is provided to a display device having any one of the arrangements mentioned above, to act as a control section of the display device.

By causing the computer to read out the program, it is possible to realize, by using the computer, the process of the control section of the display device having any one of the arrangements.

By storing the program in a computer-readable recording medium, it becomes easy to store and distribute the program. Further, by causing the computer to read the recording medium, the computer can perform the process of the control section of the display device.

For a fuller understanding of the nature and advantages of the invention, reference should be made to the ensuing detailed description taken in conjunction with the accompanying drawings.

DETAILED DESCRIPTION OF PREFERRED EMBODIMENTS

One exemplary embodiment of the present invention is described below.

Figure 2:
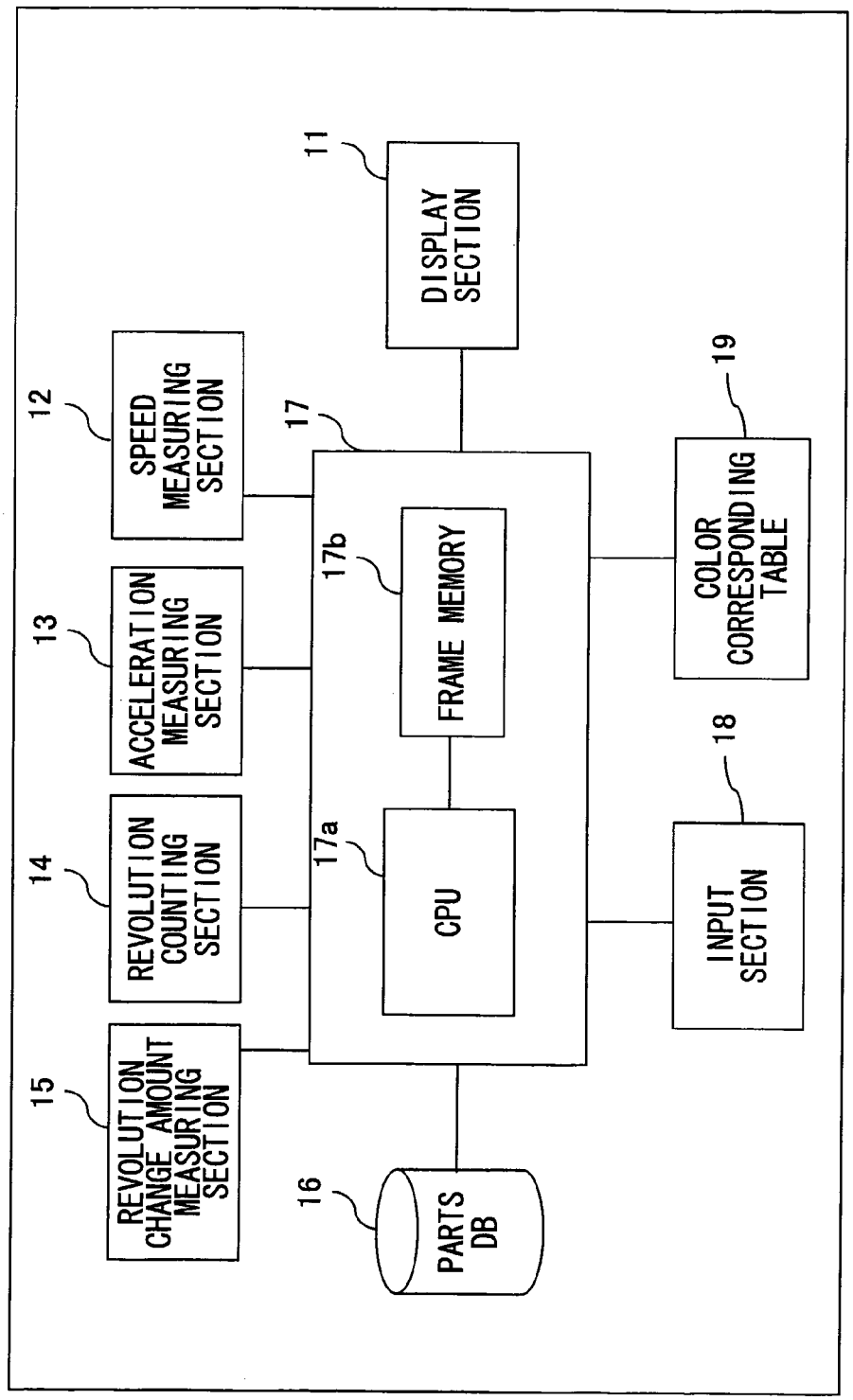
FIG. 2 is a block diagram schematically illustrating an arrangement of the display device according to the embodiment of the present invention.

FIG. 2 is a block diagram schematically illustrating an arrangement of a display device 1 according to the present embodiment. The display device 1 is provided in an instrument cluster panel of an automobile (transportation means). The display device 1 displays meters such as a speedometer (meter for speed), a revolution speeder (tachometer), and/or the like meters. Moreover, the display device 1 displays extents of changes in speed and a revolution speed respectively in the speedometer and revolution speeder in addition to the speed and the number of engine revolution (the extents of changes are amounts of changes per a given time period).

As described in FIG. 2, the display device 1 is provided with a display section 11, a speed measuring section 12, an acceleration measuring section 13, a revolution speed measuring (revolution speed measuring) section 14, a revolution speed change amount measuring section 15, a parts database (parts image database) 16 (hereinafter, parts data base DB 16), a control section 17, an input section 18, a color corresponding table 19.

A display section (display means) 11 is for displaying an image in accordance with an instruction given by the control section 17. The display section 11 according to the present embodiment is a liquid crystal panel having a super wide screen whose aspect ratio of a display region (a ratio of a breadth and length of the display region) is 7:3 (i.e. a breadth-wise dimension of the display region is 7/3 times greater than a lengthwise dimension).

The speed measuring section (speed measuring means, physical amount measuring section) 12 is for measuring the speed (which is a physical amount) of the automobile provided with the display device 1. The acceleration measuring section (acceleration measuring means, change amount measuring section) 13 is for measuring acceleration of the automobile. What is meant by the "acceleration" in the present embodiment is an extent of change in the speed with respect to a traveling direction (an amount of a change in the speed per unit time). The acceleration measuring section 13 calculates out the acceleration by differentiating the speed referring to a signal from the speed measuring section 12, or by considering, as pseudo acceleration, an amount of a change in the speed per a given time period (e.g. 0.01 second).

The revolution speed measuring section (revolution speed (revolution speed measuring means, physical amount measuring means) 14 is for measuring a revolution speed (which is a physical amount). The revolution speed change amount measuring section 15 is for measuring an extent of a change in the revolution speed (an amount of the change in the revolution speed per unit time). The revolution speed change amount measuring section (revolution speed change amount measuring means, change amount measuring means) 15 calculates the extent of the change in the revolution speed by differentiating the revolution speed referring to a signal given from the revolution speed measuring section 14, or by considering, as a pseudo change amount of the revolution speed, an amount of a change in the revolution speed per a given time period (e.g. 0.01 second).

The parts DB (database) 16 is for storing therein image data of parts images that are used to display the meters. That is, the parts DB 16 stores therein a large number of image data of parts that are to constitute images of the meters such as the speedometer, tachometer, and the like meter. Examples of the image data of the parts are, for example, instrument cluster panel (instrument cluster panel image), pointer (pointer image), numbers, characters, scale marks, three-dimension images for causing these images to be displayed with three dimension.

The input section 18 is for receiving user's input and forwards the input to the control section 17. The input section 18 includes a plurality of input keys. A user can give various instructions to the control section 17 via the input keys.

The color corresponding table 19 stores the color and tints and depths (gradations) of the color for representing amounts of changes in the speed and revolution speed per a given time period.

The control section (control means) 17 is provided with a CPU 17a and a frame memory 17b. The CPU (Central Processing Unit; control means) 17a performs all data processing, controlling, and decision making in the display device 1. The CPU 17a is a so-called "brain" of the display section 1. The frame memory 17b is for temporarily storing therein image data of an image to be displayed on the display section 11.

Figure 3:
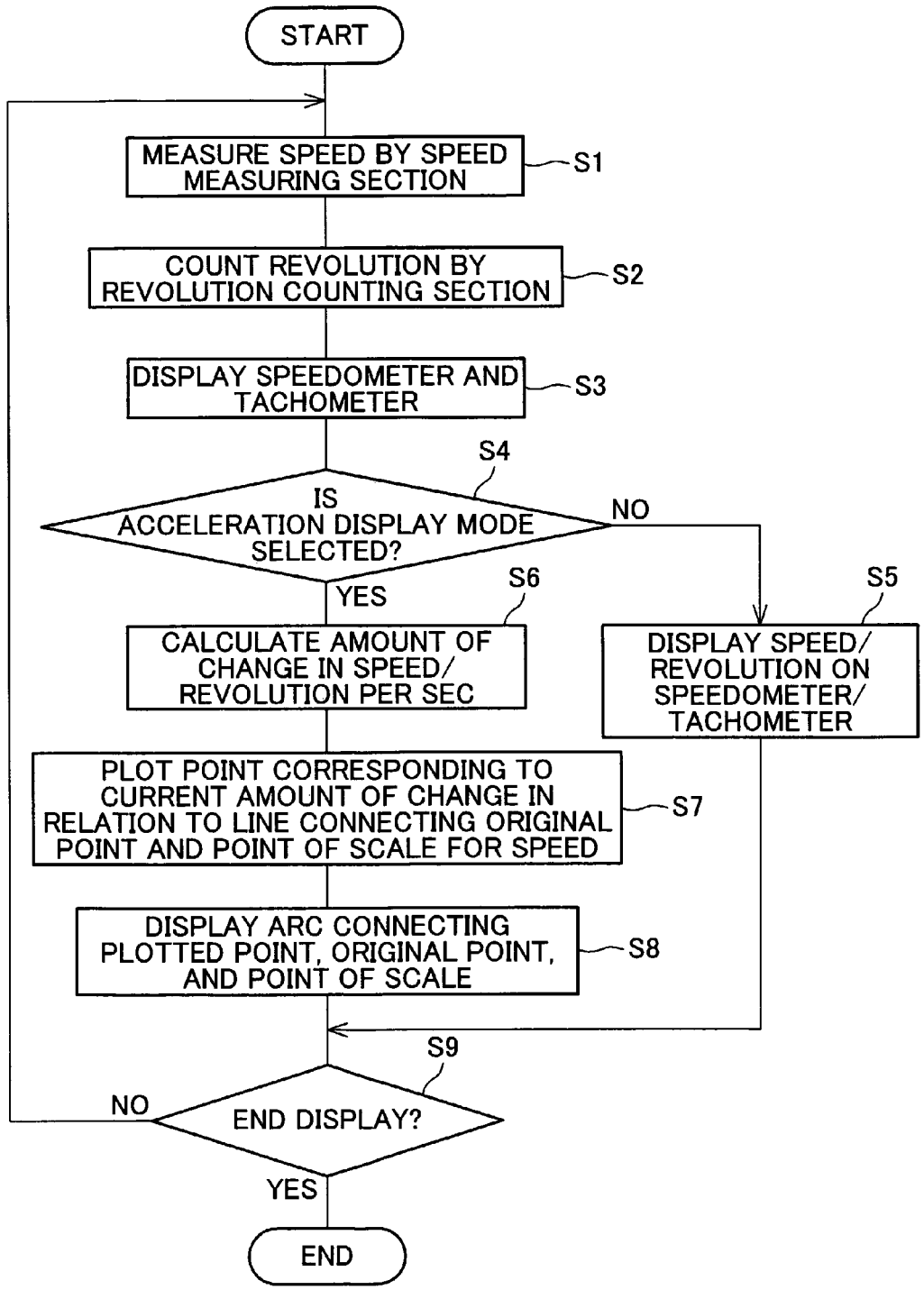
FIG. 3 is a flow chart explaining an example of display process of the display device according to the embodiment of the present invention.

A display process for displaying the speed, the revolution speed, and extents of the changes in the speed and revolution speed is described below referring to FIG. 3. FIG. 3 is a flow chart illustrating a flow of the display process of the display device 1.

As seen in FIG. 3, firstly the control section 17 (CPU 17a) causes the speed measuring section 12 to measure the speed of the automobile on which they are provided (S1). Moreover, the control section 17 causes the revolution speed measuring section 14 to measure the revolution speed (S2).

Figure 1A:
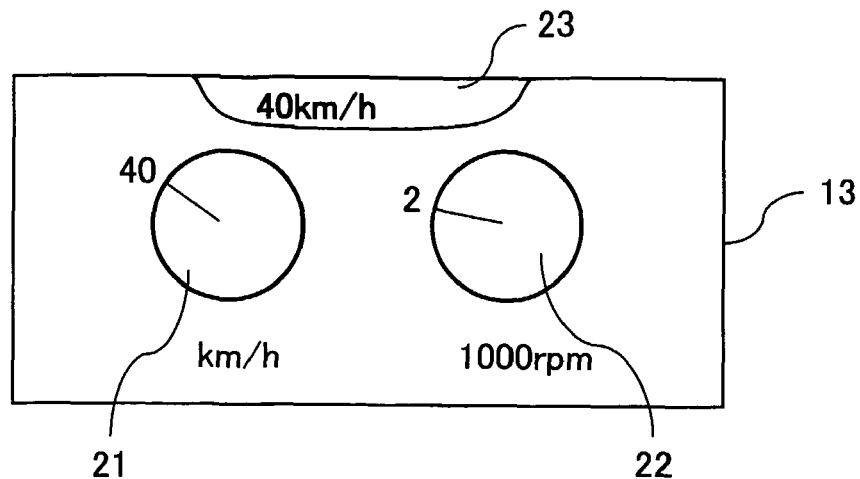
FIG. 1(a) is a view illustrating an example of a normal-display-mode display state of a display device according to one embodiment of the present invention.
Figure 1B:
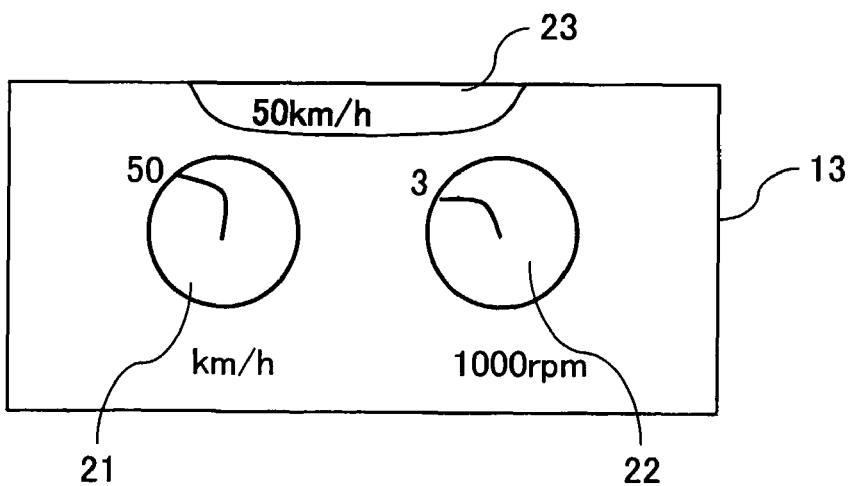
FIG. 1(b) is a view illustrating an example of an acceleration-display-mode display state of the display device according to the embodiment of the present invention.

Next, the control section 17 causes the display section 11 to display thereon a speedometer (a meter image; a speedometer image) 21, a tachometer (a meter image; a tachometer image) 22, and a second speedometer 23 (see FIGS. 1(a) and 1(b)) (S3). More specifically, the control section 17 retrieves, from the parts DB 16, image data of parts for displaying the speedometer 21, tachometer 22, and the second speedometer 23, and combines the thus retrieved image data together to form a combined image. Then, the control section 17 causes the frame memory 17b to store the combined image data therein. Then, the control section 17 causes the display section 11 to display the combined image data stored in the frame memory 17b.

Next, the control section 17 judges whether an acceleration display mode is selected or not (S4). In the present embodiment, the acceleration display mode is a display mode in which the speedometer 21 displays the speed and the amount of change in the speed per a given time period (i.e. acceleration), and the tachometer 22 displays the revolution speed and the amount of change in the revolution speed per a given time period. The present embodiment is arranged such that a user instructs, by using the input section 18, whether to select the acceleration display mode or not. Based on this user's instruction, the control section 17 makes the judgment in S4.

If the acceleration display mode is not selected (i.e. if "No" in S4), the control section 17 selects a normal display mode. Then, the speedometer 21 and the second speedometer 23 display the speed measured in S1, and the tachometer 22 displays the revolution speed (the number of engine revolution) measured in S2 (S5). The control section 17 performs process of S9 after performing the process of S5.

FIG. 1(a) illustrates an example of a display state of the display section 11 (a display state for the speedometer 21, tachometer 22, and second speedometer 23). This display state is one in the normal display mode.

The speedometer 21 has a substantially circular shape along an outer circumference of which a scale of the speed is provided (the scale is not illustrated here). A pointer (indicator), which rotates in an outer circumferential direction about a center of the substantially circular shape, is displayed so as to point that point of the scale of the speed which corresponds to the speed measured in S1. Thereby, the speed is displayed. In the normal display mode, the pointer is displayed as a straight pointer.

Like the speedometer 21, the tachometer 22 has a substantially circular shape along an outer circumference of which a scale of the revolution speed is provided (the scale is not illustrated here). A pointer, which rotates in an outer circumferential direction about a center of the substantially circular shape, is displayed so as to point that point of the scale of the revolution speed which corresponds to the revolution speed measured in S2. Thereby, the revolution speed is displayed.

The second speedometer 23 displays the speed measured in S1, similarly to the speedometer 21. That is, the display device 1 according to the present embodiment is provided with two speedometers. With this arrangement, the measured speed is surely notified to the driver. As illustrated in FIG. 1(a), the second speedometer 23 digitally displays the speed measured in S1.

On the other hand, if the acceleration display mode is selected (i.e. if yes in S4), the control section 17 calculates out the amounts of the changes in the speed and the speed and revolution speed (the number of the engine revolution speed) per second (or a given unit time) (S6). More specifically, the control section 17 causes the acceleration measuring section 13 to calculate out the amount of the change in the speed per second (i.e. acceleration), from the speed measured in S1 and a speed measured immediately before or after this measurement in S1. Moreover, the control section 17 causes the revolution speed change amount measuring section 15 to calculate the amount of the change in the revolution speed per second, from the revolution speed measured in S2, and a revolution speed measured immediately before or after this measuring in S2.

Next, the control section 17 plots, in the speedometer 21 (or the tachometer 22), a point at a position which corresponds to the current amount of change in the speed (or the revolution speed) in relation to a straight line connecting the center (axis of revolution of the pointer) and the speed measured in S1 (or the revolution speed measured in S2) (S7). Meanwhile, the control section 17 causes the second speed meter 23 to display the speed measured in S1.

For example, a speed attained at 0.5 seconds after the measurement in S1 when the vehicle speeds up at the acceleration measured in S6 is calculated out based on the speed measured in S1 and the acceleration calculated in S6, and a middle point of a straight line connecting the center of the speedometer 21 (i.e. the axis of revolution of the pointer) and the speed thus calculated out is plotted on the speedometer 21. With this, for example, if the acceleration is 1 G, a middle point of a straight line is plotted, the straight line connecting the center of speedometer 21 (i.e. the axis of revolution of the pointer) and a point of the scale indicating a speed faster than the measured speed of S1 by approximately 17.6 km/h.

Moreover, for the tachometer 22, for example, a revolution speed attained at 0.3 second (a unit time) after the measuring in S2 is calculated when the vehicle speeds up at that amount of the change in the revolution speed per second which is calculated in S6 is calculated out and a middle point of a straight line connecting the center of the tachometer 22 (i.e. the axis of revolution of the pointer) and a point of scale which corresponds to the revolution speed thus calculated is plotted on the tachometer 22. In many cases, the change in the revolution speed changes faster than the acceleration. Thus, the time interval (0.3 second in the above example) between the actual measurement of the revolution speed and the point of time on which the calculated revolution speed is based on may be shorter than the time interval (0.5 second in the above example) between the actual measurement of the speed and the point of time on which the calculated speed is based on.

Next, the control section 17 causes the speedometer 21 (or the tachometer 22) to display an arc (arc-shaped pointer (indicator) connecting the center of the speedometer 21 (or the tachometer 22), the middle point plotted in S7, and that point on the outer circumference of the speedometer 21 (or the tachometer 22) which corresponds to the speed (or the revolution speed) measured in S1 (or measured in S2) (S8).

FIG. 1(b) illustrates an example of this display state. As illustrated in FIG. 1(b), a tip portion of the arc pointer (a curved pointer) of the speedometer 21 points that point of scale which corresponds to (matches with) the speed measured in S1 (here, the measured speed is 50 km/h). A body portion of the arc-shaped pointer indicates the acceleration. Similarly in the tachometer 22, the tip portion of the arc-shaped pointer points that point of the scale which corresponds to (matches with) the revolution speed measured in S2 (here, the measured revolution speed is 3000 rpm). A body portion of the arc-shaped pointer indicates the extent of the change in the revolution speed (the amount of the change in the revolution speed per a given unit time).

After performing the display in S5 or S8, the control section 17 judges whether to cause the display device 1 to stop displaying (S9). This judgment may be made based on whether the driving is ended, i.e., whether the user makes an instruction to stop an engine.

If it is judged that the display is not to be stopped (i.e. if No in S9), the control section 17 repeats the process from the S1. If it is judged that the display is to be stopped (i.e. if Yes in S9), the control section 17 stops the process regarding the display.

The display device according to the present embodiment displays, respectively on the speedometer 21 and the tachometer 22, (i) the speed and the amount of the change therein per a given time period, and (ii) the revolution speed and the amount of the change therein per a given time period.

With this, it is possible to display the speed and the extent of the change therein, and the revolution speed and the extent of the change therein. Thus, the driver can appropriately grasp a state of the vehicle the driver is driving (moving operation).

Moreover, each of the extents of changes in these physical amounts are displayed, on one meter, together with the corresponding physical amounts. Thus, the driver can check the readings of both of the physical amounts and the corresponding extend in the change without increasing a number of directions the driver looks to or a number of occasions the driver looks at the meters. This allows the driver to recognize these information appropriately and easily without increasing burden.

FIG. 1(b) illustrates the case where the acceleration (the amount of the change in the speed per a given time period) is positive, that is, the vehicle is speeding up. However, the present invention is not limited thereto, and it is possible to display deceleration (i.e. negative acceleration when the vehicle is speeding down). To indicate the deceleration, the pointer curves in a reverse direction to that of the example illustrated in FIG. 1(b). Moreover, it is possible to indicate acceleration of constant-speed driving (constant-speed moving operation). To indicate the acceleration of the constant-speed driving (constant-speed moving operation), the pointer indicating the speed and the acceleration becomes straight similarly to the pointer in the display in the normal display mode illustrated in FIG. 1(a).

Similarly, the display of the revolution speed is not limited to the display illustrated in FIG. 1(b) where the revolution speed is increasing. It is possible to indicate a decrease or constancy in the revolution speed. If the revolution speed is constant, the pointer indicating the revolution speed and the extent of the change therein becomes straight similarly to the display in the normal display mode illustrated in FIG. 1(a).

Moreover, the present invention is not limited to the above-discussed arrangement in which the amounts of the changes in the speed and the revolution speed per given time period(s) are calculated out, by the acceleration measuring section 13 and the revolution speed change amount measuring section 15, from the measurement results measured by speed measuring section 12 and the revolution speed measuring section 14. The amounts of the changes in the speed and the revolution speed per given time period(s) may be calculated out without referring to the measurement results measured by the acceleration measuring section 13 and the revolution speed change amount measuring section 15.

Further, even though the above explanation discusses the case where the extents of the changes in the speed and the revolution speed are indicated by changing extents of curving of the pointers of the speedometer 21 and the tachometer 22, the present invention is not limited to this, as to how to indicate the extents of the changes in the speed and the revolution speed.

For example, the extents of the changes may be indicated by widths of the pointers, or the curving and widths of the pointers.

Moreover, for example, the extents of the changes in the speed and the revolution speed may be indicated by changing a color or colors of panel portions (panel color(s)) of the meters 21 and 22.

Further, the extents of the changes in the speed and the revolution speed may be indicated by changing pointer shapes and the panel color(s) of the meters 21 and 22.

Figure 4:
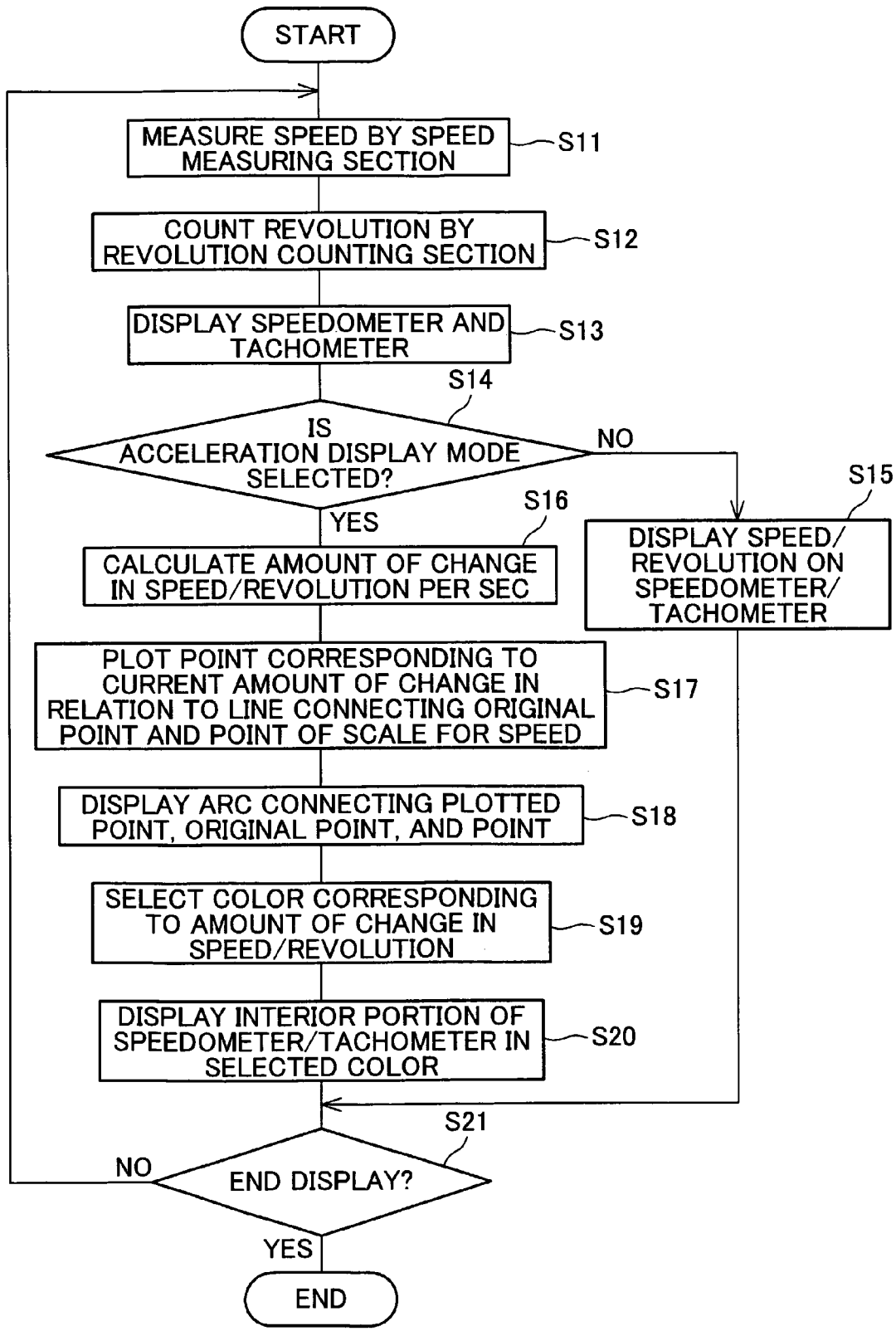
FIG. 4 is a flow chart explaining another example of the display process of the display device according to the embodiment of the present invention.

FIG. 4 is a flow chart illustrating a flow of the display process of the display device 1 in which the extents of the changes in the speed and the revolution speed are indicated by changing curving states of the pointers and the panel color(s). Referring to FIG. 4, the display process in which the extents of the changes in the speed and the revolution speed are indicated by changing the curving states of the pointer and the panel color(s).

As illustrated in FIG. 4, the control section 17 (CPU 17a) causes the speed measuring section 12 to measure the speed of the vehicle on which they are mounted on (S11). Moreover, the control section 17 causes the revolution speed measuring section 14 to measure the revolution speed (S12).

Next, the control section 17 causes the display section 11 to display thereon the speedometer 21, the tachometer 22, and the second speedometer 23 (S13). More specifically, the control section 17 retrieves, from the parts DB 16, image data of each part for displaying the speedometer 21, the tachometer 22 and the second speedometer 23, and combines the thus retrieved image data. Then, the control section 17 causes the frame memory 17b to store therein the thus combined image data temporarily. The image data of the parts includes a standard color(s) of the panel portions (meter interior area) of the speedometer 21 and the tachometer 22. Next, the control section 17 causes the display section 11 to display in accordance with the image data stored in the frame memory 17b.

Next, the control section 17 judges whether the acceleration display mode is selected or not (S14).

If the acceleration display mode is not selected (if No in S14), the control section 17 selects the normal display mode and causes the speedometer 21, the second speedometer 23, and the tachometer 22 respectively to indicate speed and the revolution speed (the number of engine revolution) respectively measured in S11 and S12 (S15). Moreover, the control section 17 performs process of S21 after the process of S15. The process of S21 will be described later.

Figure 5A:
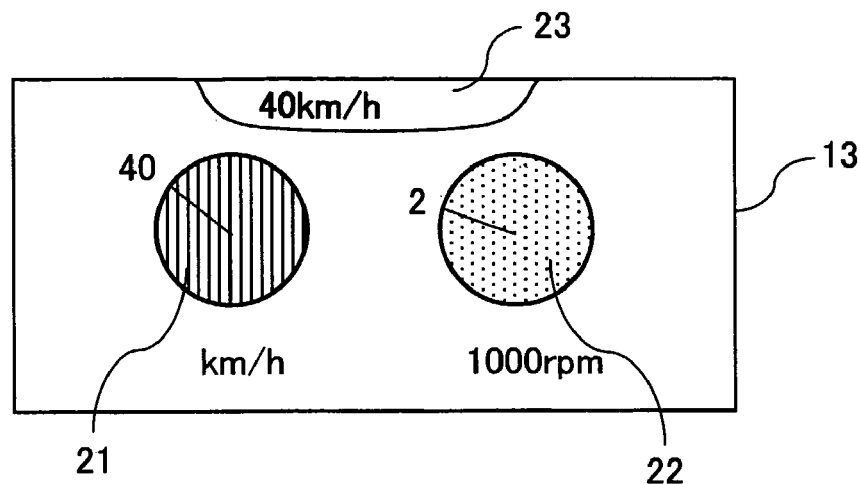
FIG. 5(a) is a view illustrating another example of the normal-display-mode display state of the display device according to the embodiment of the present invention.

FIG. 5(a) illustrates an example of a normal-display-mode display state of the speedometer 21, tachometer 22, and the second speedometer 23.

The meter interior area (panel portion) of the speedometer 21 is in thin blue color in the normal display mode, while the meter interior area (panel portion) of the tachometer 22 is in thin red color.

The pointers of the speedometer 21 and the tachometer 22, and the second speedometer 23 are displayed in the same manner as in the arrangement of FIG. 3.

On the other hand, if the acceleration display mode is selected (if Yes in S14), the control section 17 calculates out amounts of changes in the speed and the revolution speed (the number of the engine revolution speed) per second (i.e. per the given time period(s)), as in the arrangement of FIG. 3.

Next, the control section 17 plots a point which corresponds to the current amount of the change in the speed (or the revolution speed) (i.e., the amount of the change in the speed (or the revolution speed)), in relation to a straight line connecting the center (axis of revolution of the pointer) of the speedometer 21 (or the tachometer 22) and that position of the scale which corresponds to the speed (or the revolution speed) measured in S11 (or measured in S12). Moreover, the control section 17 causes the second speedometer 23 to display the speed measured in S11. The process of S17 is performed in a similar manner to the process of S7 in FIG. 3.

Next, the control section 17 causes the speedometer 21 (or the tachometer 22) to displays an arc (arc-shaped pointer (indicator) connecting the center (axial of revolution of the pointer) of the speedometer 21 (or the tachometer 22), the point plotted in S17, and that point of the meter which corresponds to that position of the scale which indicates to the speed (or the revolution speed) measured in S11 (or measured in S12) (S18).

Further, the control section 17 selects a color which corresponds to the amount of the change in the speed (or the revolution speed) (S19). The color corresponding to the amount of the change in the speed (or the revolution speed) is stored in advance in the color corresponding table 19. The control section 17 retrieves (selects), from the color corresponding table 19, the color that corresponds to the amount of the change in the speed (or the revolution speed).

Then, the speed meter 21 (or the tachometer 22) performs display with its meter interior area (panel portion) colored in the color selected in S19 (S20).

Figure 5B:
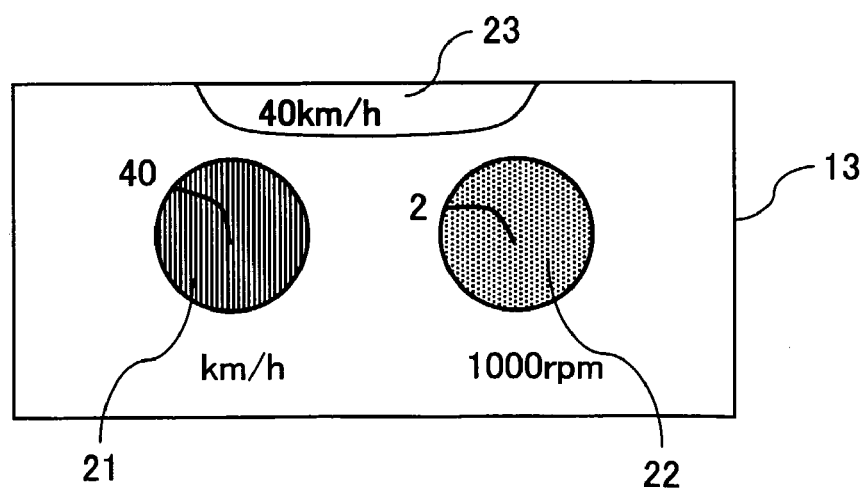
FIG. 5(b) is a view illustrating another example of the acceleration-display-mode display state of the display device according to the embodiment of the present invention.

FIG. 5(b) illustrates an example of a display state of the display section 11 when the vehicle is speeding up. As illustrated in FIG. 5(b), the arc-shaped pointer of the speed meter 21 indicates the speed measured in S1 and the acceleration calculated in S16. Further, in FIG. 5(b), because the speed is increasing, the panel portion of the speedometer 21 is in a thicker color (thicker blue) than the color of the panel portion thereof in the constant-speed driving (constant-speed moving operation) (this color in the constant-speed driving is the same as the color of the panel portion thereof in the normal display mode; a thin blue in the present embodiment). Moreover, as to the revolution speed, because the revolution speed is increasing, the panel portion of the tachometer 22 is in a thicker color (thicker red) than the color of the panel portion thereof in the constant revolution speed (this color in the constant-speed driving is the same as the color of the panel portion thereof in the normal display mode; thin red in the present embodiment).

Further, after the display in S15 or S20 is performed, the control section 17 judges whether to cause the display device 1 to stop displaying (S21). This judgment may be made based on whether the driving (moving operation) is ended, i.e., whether the user makes an instruction to stop an engine.

If it is judged that the display is not to be stopped (if No in S21), the control section 17 repeats the process from S11. Moreover, if it is judged that the display is to be stopped (if Yes in S21), the control section 17 ends the process regarding the display.

With this arrangement in which the curving state of the pointers, and the colors of the meter interior areas, of the meters 21 and 22 are changed according to the amount of the change in the speed and the revolution speed per the given time period(s), it becomes possible for the driver to more appropriately grasp the extends of the acceleration and the change in the revolution speed.

The present invention is not limited to the arrangement illustrated in FIG. 5(b) which deals with the display process in which the speed is increasing and the revolution speed is increasing. The present invention is also applicable to perform display for indicating that the speed is decreasing and the revolution speed is decreasing. The display for indicating that the speed is decreasing and the revolution speed is decreasing may be arranged as follows for example: the meter interior areas of the meters 21 and 22 are displayed in different color(s) from the color(s) thereof that is displayed in the normal display mode, the color(s) changed in its thickness (gradation) depending on the amounts of the changes in the speed and the revolution speed. Alternatively, the color of the meter interior areas of the speedometer 21 (or the tachometer 22) may be the same color but the color is changed in color thickness (gradation) in the acceleration and deceleration (or when the revolution speed is increasing and when the revolution speed is decreasing). That is, the meters 21 and 22 may be arranged such that the color displayed when the speed and the revolution speed are decreasing is thinner than the color displayed when the speed and the revolution speed are constant (i.e., the color in the normal display mode).

Moreover, the present invention is not limited to the arrangement discussed above in which the curving states of the pointers, and the colors of the meter interior areas, of the speedometer 21 and the tachometer 22 are changed in order to indicate the amount of the change in the speed and the revolution speed in the given time period(s). For example, the amount of the change in the speed and the revolution speed may be indicating by changing the color(s) of the speedometer 21 and the tachometer 22, without changing the curving states of the pointers. Furthermore, the amount of the change in the speed and the revolution speed may be indicating by changing the curving states of the pointers, while the color(s) of the speedometer 21 and the tachometer 22 may be used to indicate a physical amount(s), for example, oil pressure and oil temperature of various hydraulic systems, temperature of engine coolant, or an extent of a change in the physical amount(s).

Moreover, the present invention is not limited to the arrangement explained above in which the extents of the changes in the speeds and the revolution speed are indicated by changing the colors of the panel portions of the meters 21 and 22. For example, graphic images (parts) of the meters 21 and 22 may be changed according to the extents of the change in the speed and the revolution speed. In this arrangement, the graphic images (parts) of the meters 21 and 22 are not particularly limited, and may be, e.g., the pointers, scale marks, frames, of the meters 21 and 22. Furthermore, a graphic image may be displayed in the speedometer 21 (or the tachometer 22), the graphic image having a color that changes according to the extent of the change in the speed (or the revolution speed).

Moreover, how to indicate the extents of the changes in the speed and the revolution speed is not limited to the changing of the colors of the panel portion or the other graphic images of the meters 21 and 22. For example, the extents of the changes in the speed and the revolution speed may be indicated by changing color of an other area of the display section 11 than the meters 21 and 22. Moreover, the extents of the changes in the speed and the revolution speed may be indicated by using, in appropriate combination, (i) the curving of the pointer, (ii) thickness of the pointer, (iii) color of the panel portion, (iv) color of the graphic image other than the pointer and the panel portion, and (v) the area of the display section 11 than the meters 21 and 22.

Figure 6:
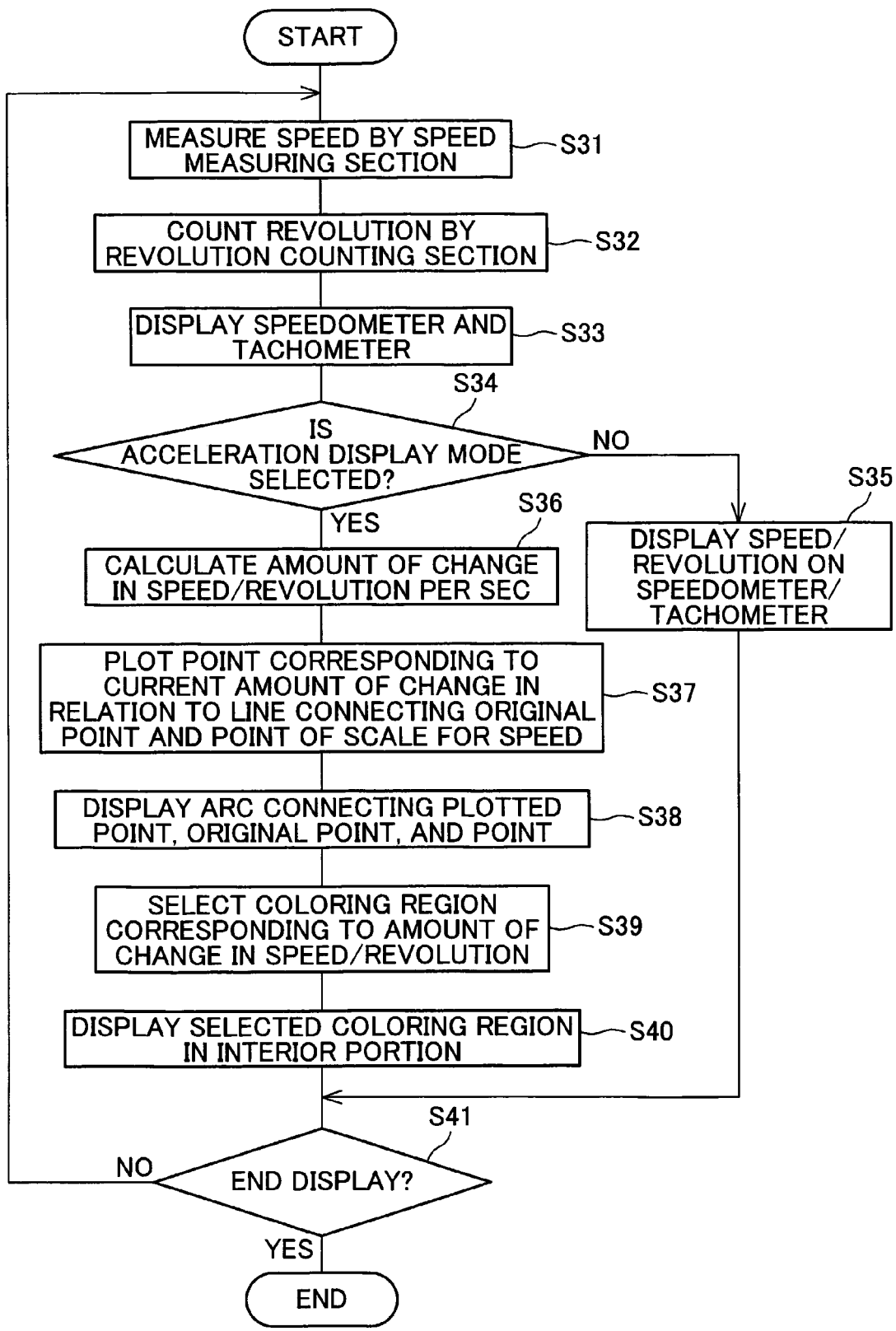
FIG. 6 is a flow chart explaining still another example of the display process of the display device according to the embodiment of the present invention.

Furthermore, for example, the extents of the changes in the speed and the revolution speed may be indicated by changing shapes of the pointers of the meters 21 and 22 and an area (range) of that region of the panel portion which has a different color from a normal color of the panel portion (hereinafter, this region is referred to as "coloring region"). FIG. 6 is a flow chart illustrating a flow of the display process of the display device 1 in this arrangement. Referring to FIG. 6, the arrangement is described below in which the extents of the change in the speed and the revolution speed are indicated by using the shapes of the pointers and an area of the coloring region of the panel portion.

Processes of S31 to S38 in FIG. 6 are substantially similar to the processes of S1 to S18 in FIG. 4, and their explanation is omitted here.

After an arc-shaped pointer (indicator) is displayed in S38 as in S18 of FIG. 4, the control section 17 selects those ranges of the coloring regions which respectively correspond to the amounts of the changes in the speed and the revolution speed (S39).

The color corresponding table 19 stores therein which range and color correspond to which amount of the change in the speed and the revolution speed. The control section 17 retrieves (selects) the range and color that correspond to the amount of the change in the speed (or the revolution speed).

Then, the speedometer 21 and the tachometer 22 display in such a manner that their interior areas (panel portions) are displayed with the coloring region and the color selected in S39 (S40).

Figure 7A:
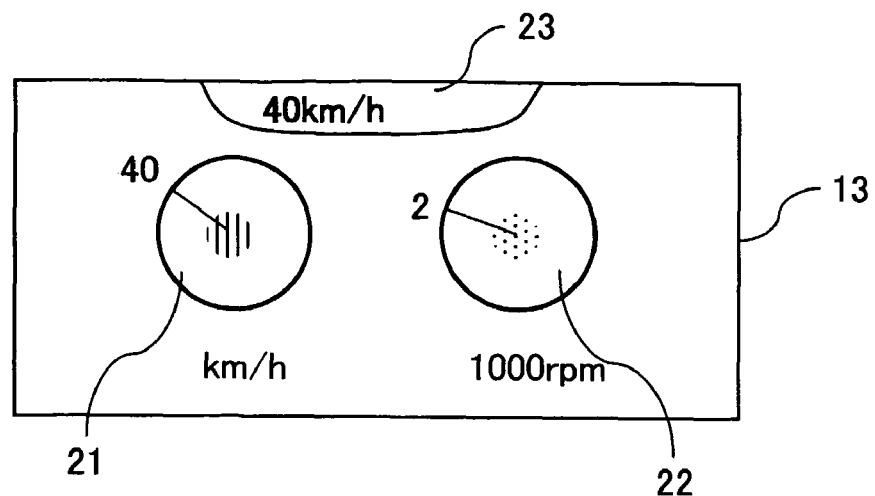
FIG. 7(a) is a view illustrating still another example of the acceleration-display-mode display state of the display device according to the embodiment of the present invention when a speed and a revolution speed are constant.
Figure 7B:
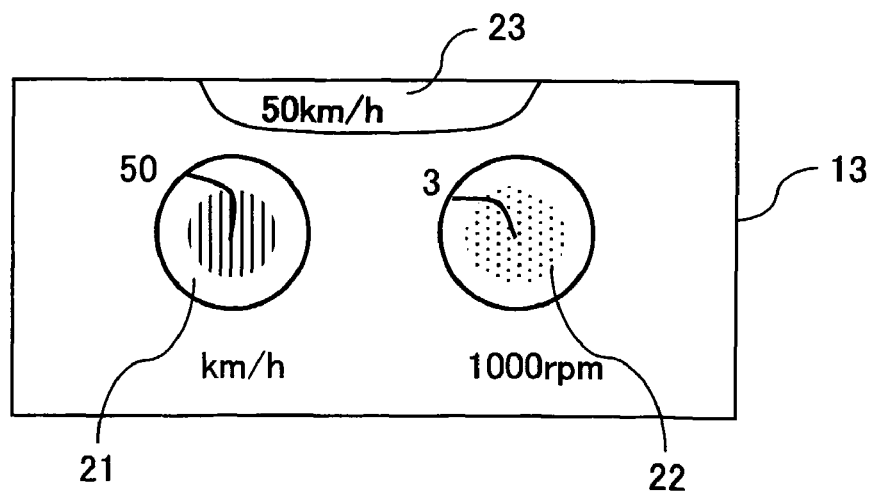
FIG. 7(b) is a view illustrating still another an example of the acceleration-display-mode display state of the display device according to the embodiment of the present invention when the speed and the number of engine revolution are increasing.

FIGS. 7(*a*) and 7(*b*) illustrate examples of this display state. FIG. 7(*a*) illustrates an example of the display state in the case where the speed and the revolution speed are constant, that is, the amounts of the changes in the speed and the revolution speed per the given time period(s) are zero. As illustrated in FIG. 7(*a*), in case where the speed and the revolution speed are constant, a preset coloring range (standard coloring range) is displayed in a color different from a color (normal color) of the other area of the panel portion.

FIG. 7(*b*) illustrates an example of the display state in case where the speed and the revolution speed are increasing. As illustrated in FIG. 7(*b*), the arc-shaped pointer of the speedometer 21 indicates the speed measured in S31, and the acceleration calculated in S36. Further, in FIG. 7(*b*), the coloring region in the panel portion is wider than the coloring region (standard coloring region) in case of the constant-speed driving (constant-speed moving operation). In this example illustrated in FIGS. 7(*a*) and 7(*b*), the coloring region is in a circular shape centered at the axis of revolution of the pointer. A radius of the circular shape is changed according to how much the acceleration is. Moreover, because the amount of the change in the revolution speed is also increasing, the coloring region of the panel portion is wider than the coloring region (standard coloring region) of the case where the revolution speed is constant. That is, in the tachometer 22, the coloring region in the circular shape centered at the axis of the revolution of the pointer is changed by changing its radius according to the extent of the amount of the change in the revolution speed.

FIG. 7(*b*) illustrates the case where the speed and the revolution speed are increasing. For indicating the deceleration and reduction in the revolution speed, the coloring region may be changed to have a smaller radius than that of the standard coloring region.

After performing the display in S35 or S40, the control section 17 judges whether to cause the display device 1 to stop displaying (S41). This judgment may be made based on whether the driving (moving operation) is ended, i.e., whether the user makes an instruction to stop an engine.

If it is judged that the display is not to be stopped (i.e. if No in S41), the control section 17 repeats the process from the S1. If it is judged that the display is to be stopped (i.e. if Yes in S41), the control section 17 stops the process regarding the display.

With this arrangement in which the curving states of the pointers and the coloring regions of the meters 21 and 22 are changed according to the amounts of the changes in speed and the revolution speed per the given time period(s), it becomes possible for the driver to easily and appropriately grasp the acceleration and the extent of the change in the revolution speed.

The present invention is not limited to the arrangement explained above in which the standard coloring region is in the color other than the normal color when the speed and revolution speed are constant. For example, the panel portion may be in one color (i.e. the area of the coloring region is zero) when the speed and the revolution speed are constant, while the panel portion is in more than two colors (i.e. the panel portion has the coloring region) when the speed and the revolution speed are increasing or decreasing. In this case, how large the coloring regions are may be determined based on absolute values of the amounts of the changes in the speed and the revolution speed per the given time period(s).

Moreover, as to the shape and location of the coloring regions, the present invention is not limited to the arrangement explained above in which the coloring regions in the circular shapes centered at the axes of revolution of the pointers are displayed so as to indicate the amounts of the changes in the speed and the revolution speed per the given time period. For example, the coloring region may be expanded from an outer circumferential side of the meter 21 or 22 toward its axis of revolution of the pointer. Moreover, for example, the extents of the changes in the speed and the revolution speed may be indicated by changing heights of the coloring regions according to the amounts of the changes in the speed and the revolution speed per the given time period(s), where bottom points of outer circumferences of the meters 21 and 22 are bottom of the coloring regions.

Moreover, the present invention is not limited to the arrangement explained above in which the amounts of the changes in the speed and the revolution speed per the given time period(s) are indicated by using the curving of the pointers and the areas of the coloring regions. The amounts of the changes in the speed and the revolution speed per the given time period(s) may be indicated by using only the areas of the coloring regions.

Furthermore, the present invention is not limited to the arrangement explained above in which the speedometer 21 and the tachometer 22 are displayed. For example, the speed and the revolution speed and the amounts of their changes per the given time period(s) may be displayed by using one meter. For example, the one meter for indicating both the speed and the revolution speed may be arranged as follows: the speed is indicated by a pointer whose tip portion points at a scale mark of the scale, and the acceleration is indicated by a curving state of the pointer; and the meter is displayed with three dimensions and a height of the meter having three dimensions indicates the revolution speed while a color of the meter is changed in order to indicate the amount of the change in the revolution speed per the given time period.

Figure 8:
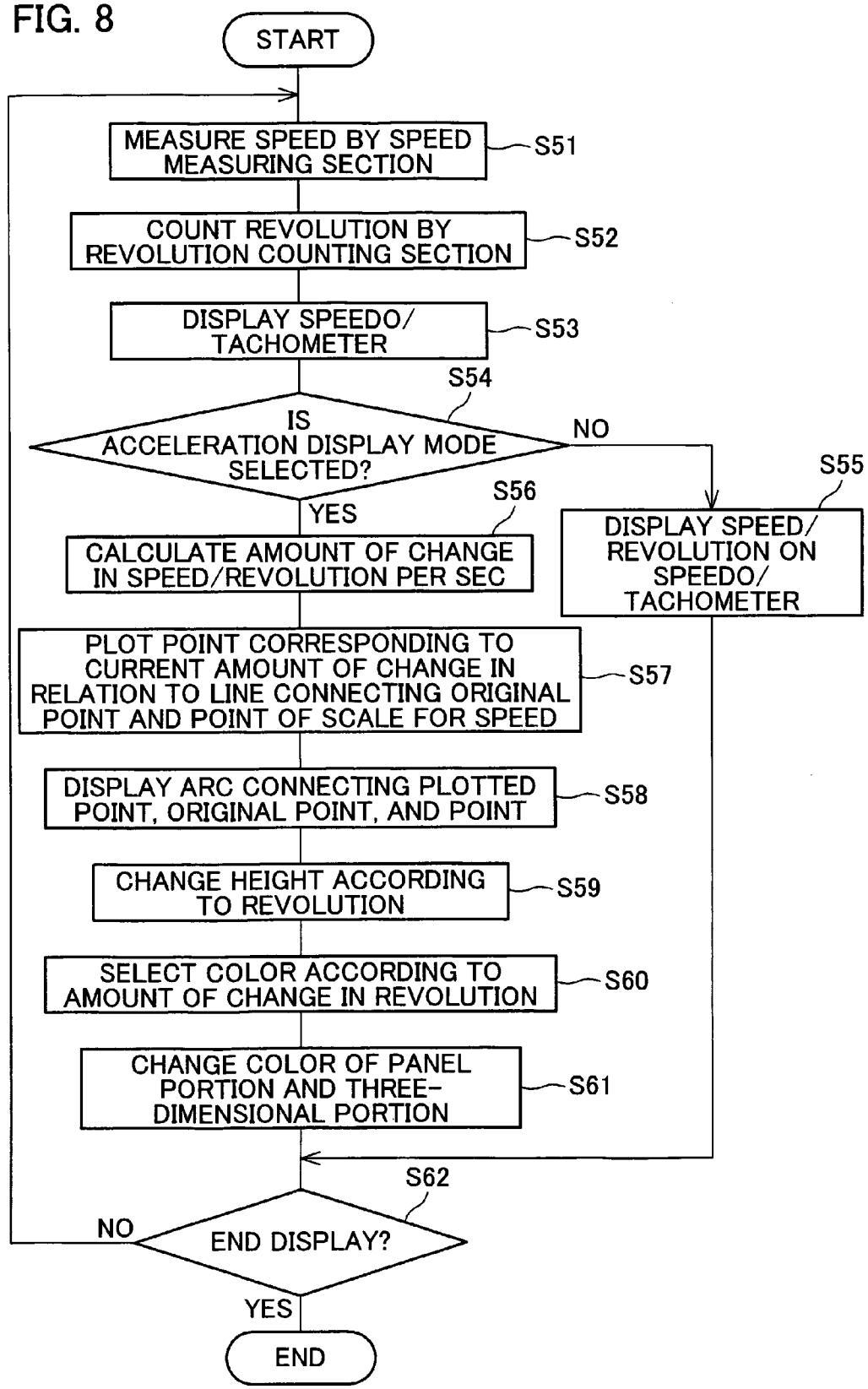
FIG. 8 is a flow chart illustrating yet another example of the display process of the display device according to the embodiment of the present invention.

FIG. 8 is a flow chart illustrating a flow of process for performing such display. Referring to FIG. 8, the process for performing the display is explained below.

As illustrated in FIG. 8, the control section 17 (CPU 17*a*) causes the speed measuring section to measure the speed of the vehicle on which they are provided (S51). Moreover, the control section 17 causes the revolution speed measuring section 14 to measure the revolution speed (S52).

Next, the control section 17 causes the display section 11 to display thereon a speedo/tachometer 31 (see FIGS. 9(*a*) and 9(*b*) explained later) and the second speed meter 23 (S53).

More specifically, the control section 17 retrieves, from the part DB 16, image data of parts for displaying the speedo/tachometer (meter image) 31 and the second speed meter 23, and combines the image data thus retrieved. Then, the control section 17 causes the frame memory 17*b* to store the combined image data temporarily. The speedo/tachometer 31 has (i) a panel portion in a substantially circular shape and (ii) a three-dimension displaying portion by which the panel portion is displayed with three dimensions. Moreover, the image data for the parts includes the image data of the parts and their standard color(s). The control section 17 causes the display section 11 to display thereon the image data stored in the frame memory 17*b*.

Next, the control section 17 judges whether the acceleration display mode is selected or not (S54).

If the acceleration display mode is not selected (if No in S54), the control section 17 selects the normal display mode and causes the speedo/tachometer 31 and the second meter 23 to display the speed and revolution speed (the number of engine revolution) respectively measured in S51 and the S52 (S55). After the process in S55, the control section 17 performs process of S62 described later.

Figure 9A:
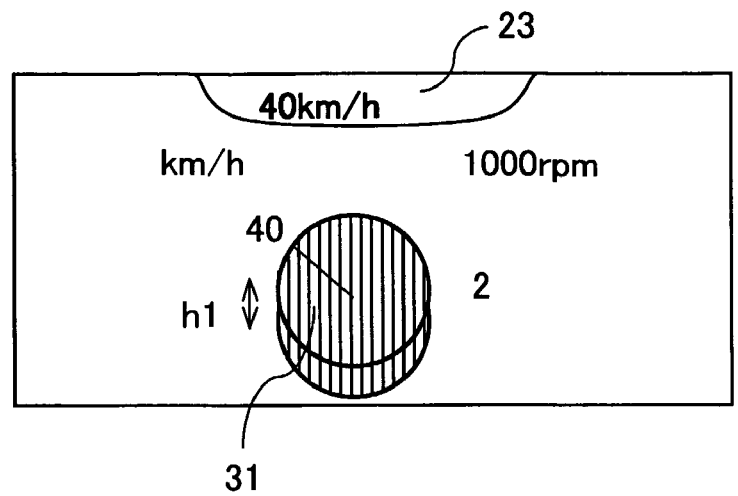
FIG. 9(a) is a view illustrating yet another example of the normal-display-mode display state of the display device according to the embodiment of the present invention.

FIG. 9(*a*) illustrates an example of a display state of the display section 11 (the speedo/tachometer 31 and the second speed meter 23) in the normal display mode.

The speedo/tachometer 31 has the panel portion that is in a substantially circular shape. A scale (not illustrated) for the speed is provided on an outer circumference of the panel portion. The speedo/tachometer 31 displays thereon a pointer (indicator) that rotates about a center of the panel portion in the substantially circular shape along an outer circumferential direction. The pointer points that position of the scale for the speed which corresponds to the speed measured in S51. Thereby, the speedo/tachometer 31 indicates the speed. In the normal display mode, the pointer is displayed as a straight pointer.

Moreover, the speedo/tachometer 31 has the three-dimension displaying portion that displays the panel portion with three dimensions. The control section 17 determines a height of the three-dimension displaying portion according to the revolution speed (the number of the engine revolution speed) measured in S52. That is, the revolution speed is indicated by the height of the three-dimension displaying portion.

Moreover, in the normal display mode the control section 17 causes the panel portion and the three-dimension displaying portion (except the pointer and the scale) to be displayed in a preset standard color (e.g. thin red).

The second speedometer 23 displays in a similar manner to the display method illustrated in FIG. 3.

On the other hand, if the acceleration display mode is selected (if Yes in S54), the control section 17 calculates the amounts of the changes in the speed and the revolution speed (the number of the engine revolution speed) per second (per the preset time period) (S56).

Next, the control section 17 plots a point that corresponds to the current acceleration (the amount of the change in the current speed per the given time period), in relation to a straight line connecting (i) the center (axis of revolution of the pointer) of the panel portion of the speedo/tachometer 31 and (ii) that position of the scale which corresponds to the speed measured in S51 (S57). This process is performed in a similar manner to that of S7 of FIG. 3.

Next, the control section 17 causes the speedo/tachometer 31 to display an arc (arc-shaped pointer (indicator) 9 connecting the center of the panel portion (axis of revolution of the pointer), the point plotted in S57, and that point on an outer circumference of the panel portion which corresponds to that position of the scale which indicates the speed measured in S51 (S58). With this, the speed is indicated by that position of the scale which is pointed by the pointer, while the curving of the pointer indicates the acceleration.

Next, the control section 17 calculates the height of the three-dimension displaying portion from the revolution speed measured in S52, and changes the height of the three-dimension displaying portion according to the height thus calculated out (S59).

Next, the control section 17 selects the color that corresponds to the amount of the change in the revolution speed per the given time period, the amount calculated in S56 (S60). The color corresponding to the amount of the change in the revolution speed is stored in the color corresponding table 19 in advance. The control section 17 retrieves (selects) the color from the color corresponding table 19, according to the amount of change in the revolution speed. Different colors may be used according to the amount of the change, or the color may be changed in thickness according the amount of the change.

Then, the speedo/tachometer 31 is displayed with the panel portion and the three-dimension displaying portion colored in the color selected in S60 (S61).

Figure 9B:
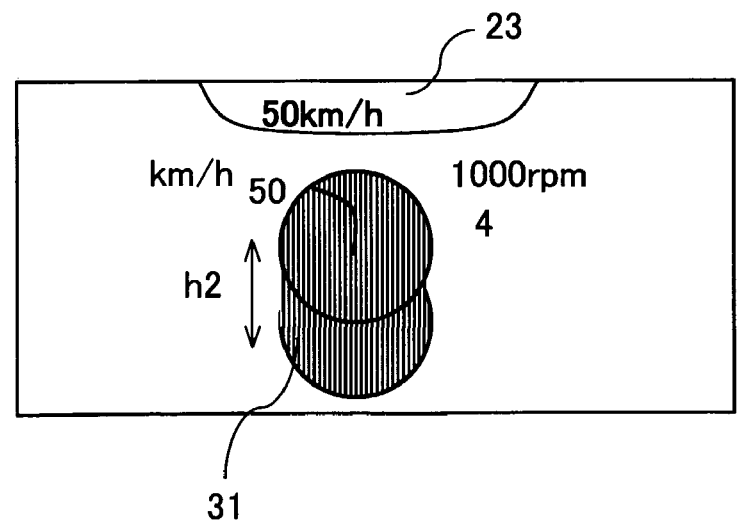
FIG. 9(b) is a view illustrating yet another example of the acceleration-display-mode display state of the display device according to the embodiment of the present invention.

FIG. 9(b) illustrates an example of the display state of the display section 11 (i.e. the display state of speedo/tachometer 31) when the speed is increasing. As illustrated in FIG. 9(b), the arc-shaped pointer of the speedo/tachometer 31 indicates the speed measured in S51 and the acceleration calculated in S56. Further, in FIG. 9(b), the height of the three-dimension displaying portion (h2 in FIG. 9(b)) indicates the revolution speed measured in S52, and the color (e.g., thick red) of the panel portion and the three-dimension displaying portion indicates the amount of the change in the revolution speed per the given time period, the revolution speed calculated in S56.

After performing the display in S55 or S61, the control section 17 judges whether to cause the display device 1 to stop displaying (S62). This judgment may be made based on whether the driving (moving operation) is ended, i.e., whether the user makes an instruction to stop an engine.

If it is judged that the display is not to be stopped (i.e. if No in S62), the control section 17 repeats the process from the S51. If it is judged that the display is to be stopped (i.e. if Yes in S62), the control section 17 stops the process regarding the display.

In this way, the speed is indicated by that position of the scale at which the pointer points, and the acceleration is indicated by the curving state of the pointer. Meanwhile, the meter is displayed with three dimensions so as to indicate the revolution speed by the height of the shape having three dimensions. The color of the meter is changed so as to indicate the amount of the change in the revolution speed per the given time period. With this arrangement it is possible to indicate the speed, revolution speed, and their amount of the changes per the given time period(s).

With this, the driver can refer to these pieces of information by looking at less directions within a smaller range of area.

How to indicate the speed, revolution speed, and the amounts of their changes per the given time period(s) with one meter is not limited to the above method. For example, the physical amounts may be displayed by using another combination of the scale that the pointer points, the curving state of the pointer, the height of the three-dimension displaying section, and the colors of the panel portion and the three-dimension displaying portion. Moreover, the physical amounts may be displayed by using shapes and colors of parts images different from the panel portion or the three-dimension displaying portion.

How to display the meter is not limited to the arrangement described above in which the panel portion having the substantially-circular shape and the pointer displayed on the panel section are used to indicate the speed, revolution speed, and the amounts of their changes per given time period.

For example, the speed and the revolution speed may be displayed by changing the coloring region along the scale, not by using the pointer. In this case, the amounts of the changes in the speed and the revolution speed per the given time period(s) may be indicated by changing a width of the coloring region.

Figure 10:
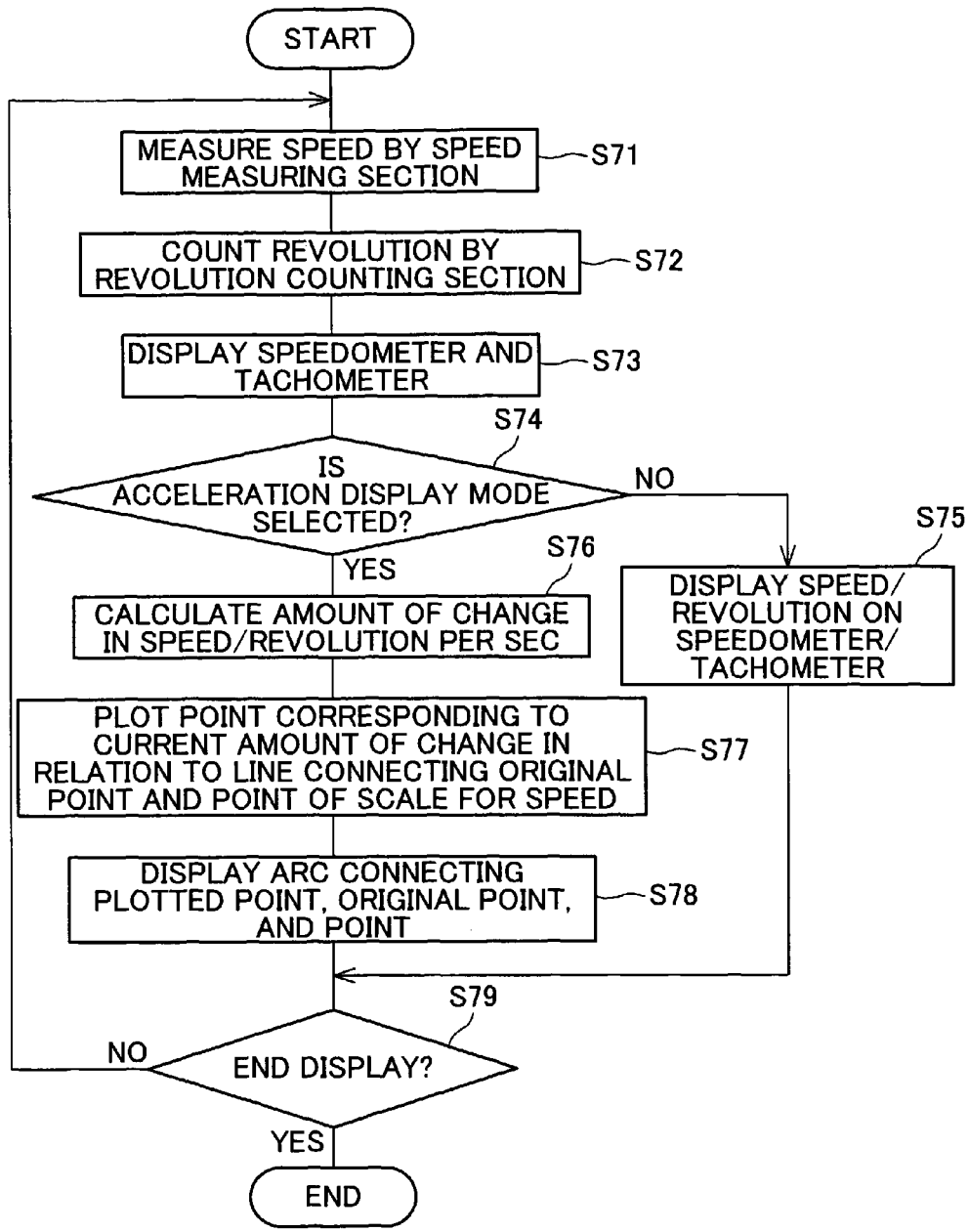
FIG. 10 is a flow chart illustrating yet still another example of the display process of the display device according to the embodiment of the present invention.

FIG. 10 is a flow chart illustrating an example of the process for such display.

As illustrated in FIG. 10, the control section 17 (CPU17a) firstly causes the speed measuring section 12 to measure the speed on which they are mounted (S71). Moreover, the control section 17 causes the revolution speed measuring section 14 to measure the revolution speed (S72).

Next, the control section 17 causes the display section 11 to display a speedometer (meter image, speedometer image) 21a, a tachometer (meter image, tachometer image) 22a, and the second speedometer 23 (see FIGS. 11(a) and 11(b) described later) (S73). More specifically, the control section 17 retrieves, from the parts DB 16, image data of parts for displaying the speedometer 21a, tachometer 22a, and second speedometer 23, and combines the parts images. Then, the control section 17 causes the frame memory 17b to store the combined image data temporary. Next, the control section 17 causes the display section 11 to display the image data stored in the frame memory 17b.

Next, the control section 17 judges whether the acceleration display mode is selected or not (S74). Here, the acceleration display mode is a display mode in which the speedometer 21a is caused to display the speed and its amount of change per the given time period (i.e. acceleration), and the tachometer 22a is caused to display the revolution speed and the amount of its change per the given time period. The present embodiment is arranged such that a user instructs, by using the input section 18, whether to select the acceleration display mode or not. Based on this user's instruction, the control section 17 makes the judgment in S74.

If the acceleration display mode is not selected (if No in S74), the control section 17 selects the normal display mode and causes the speedometer 21a and the second speedometer 23 to display the speed measured in S71, and causes the tachometer 22a to display the revolution speed (number of the engine revolution speed) measured in S72 (S75). After performing the process of S75, the control section 17 performs process of S79 described later.

Figure 11A:
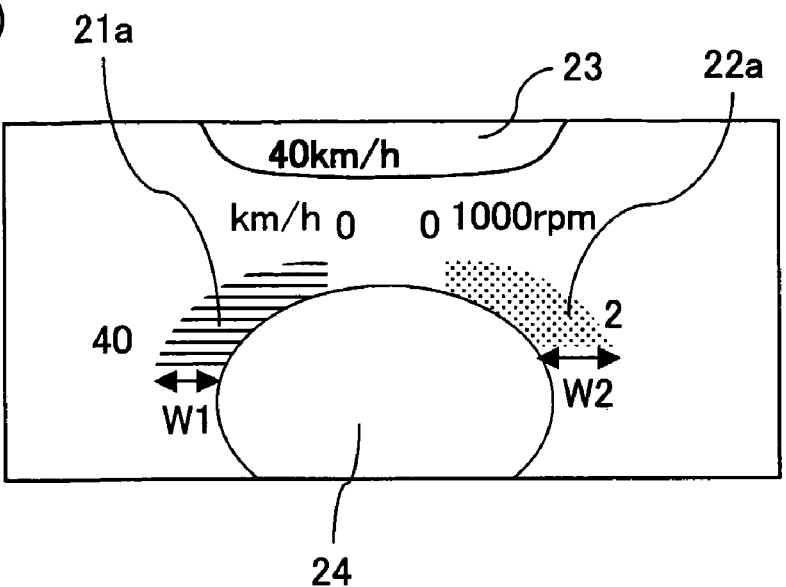
FIG. 11(a) is a view illustrating yet still another example of the normal-display-mode display state of the display device according to the embodiment of the present invention.

FIG. 11(a) illustrates an example of the display state (speedometer 21a, tachometer 22a, and the second speedometer 23) of the display section 11 in the normal display mode.

In the example illustrated in FIG. 11(a), a scale panel 24 is displayed in the display section 11. Around the scale panel 24, the speedometer 21a and the tachometer 22a are displayed.

The scale panel 24 has a substantially elliptic shape. On an outer circumference thereof, a speed scale for the speedometer 21a, and a revolution speed scale for the tachometer 22a are displayed (both the scales are not illustrated here). In the example illustrated in FIGS. 11(a) and 11(b), that position of the speed scale which corresponds to 0 km/h is located at a point slightly left from a top of the scale panel 24. For indicating higher speeds, the speed scale is extended from there anticlockwise along the outer circumference of the scale panel 24. Moreover, that position of the revolution speed scale which corresponds to 0 rpm is displayed at a point slightly right from the top of the scale panel 24. For indicating higher revolution speed, the revolution speed scale is extended from there clockwise along the outer circumference of the scale panel 24.

The speedometer 21a is displayed in a vicinity of the speed scale of the scale panel 24. The speed to be indicted is indicated by displaying a coloring region (which is displayed in a color different from the normal color) along the speed scale according to the speed to be indicated. For example, in case where 40 km/h is to be indicated as illustrated in FIG. 11(a), the coloring region is displayed from the position of the speed scale which indicates the 0 km/h to the that position of the speed scale which indicates 40 km/h. In the normal display mode the coloring region has a width (line width) is set to a preset width (W1 in FIG. 11(a)). There is no particular limitation in the color of the coloring region. However, the coloring region is in blue here for example.

The tachometer 22a is displayed in a vicinity of the revolution speed scale of the scale panel 24. The revolution speed to be indicted is indicated by displaying a coloring region (which is displayed in a color different from the normal color) along the revolution speed scale according to the revolution speed to be indicated. For example, in case where 2000 rpm is to be indicated as illustrated in FIG. 11(a), the coloring region is displayed from the position of the revolution speed scale which indicates the 0 rpm to the that position of the revolution speed scale which indicates 2000 rpm. In the normal display mode the coloring region has a width (line width) is set to a preset width (W2 in FIG. 11(a)). There is no particular limitation in the color of the coloring region. However, the coloring region is in red here for example.

The second speedometer 23 is for displaying the speed measured in S71, like the speedometer 21a. As illustrated in FIG. 11(a), the second speedometer 23 digitally displays the speed measured in S71.

On the other hand, if the acceleration display mode is selected (if Yes in S74), the control section 17 calculates the amounts of the changes in the speed and the revolution speed (the number of the engine revolution speed) per second (per the given time period(s) (S76).

Next, the control section 17 converts the amounts of the changes in the speed and the revolution speed per second into the widths of the coloring regions of the speedometer 21a and the tachometer 22a, the amount of the changes calculated in S76 (S77). That is, the control section 17 calculates the widths of the coloring region of the meters 21a and 22a according to the amounts of the changes in the speed and the revolution speed, the amounts of the changes calculated in S76. For example, the widths (W1, W2) in the normal display mode are put as widths for constant speed and constant revolution speed, and the widths are changed respectively according to the amounts of the changes. That is, when the speed (or the revolution speed) is increasing, the width of the coloring region for the speed (or the revolution speed) becomes wider than W1 (or W2). When the speed (or the revolution speed) is decreasing, the width of the coloring region for the speed (or the revolution speed) becomes narrower than W1 (or W2). The widths are widen/narrowed respectively in proportion to the amounts of the changes in the speed and the revolution speed per the given time period(s).

Next, the control section 17 causes the speedometer 21a and the tachometer 22a to be displayed to indicate, with the coloring regions having the widths calculated in S77, the speed and revolution speed measured in S71 and S72 (S78).

Figure 11B:
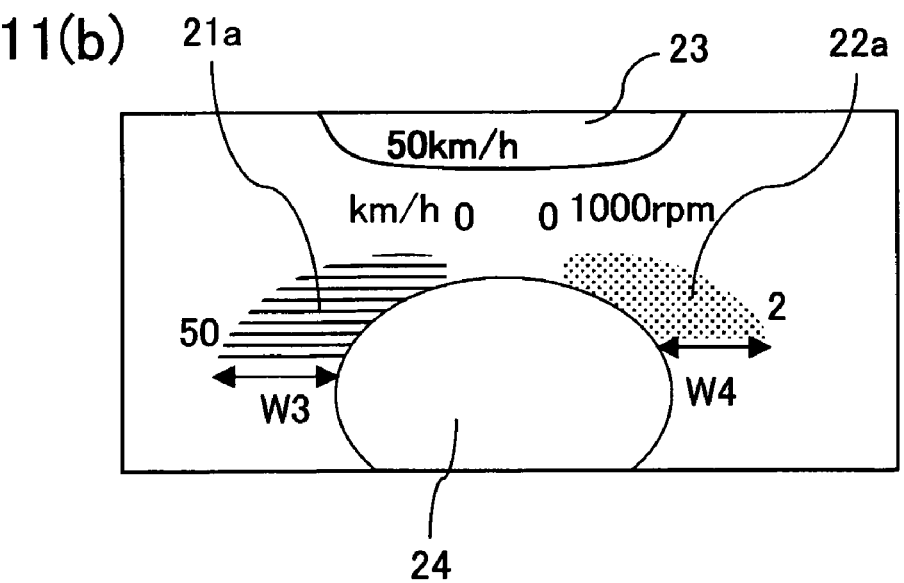
FIG. 11(b) is a view illustrating yet still another example of the acceleration-display-mode display state of the display device according to the embodiment of the present invention.

FIG. 11(b) illustrates an example of this display state. As illustrated in FIG. 11(b), the speedometer 21a is displayed such that the coloring region is extended along an outer circumference of the speed scale of the scale panel 24 (from 0 km/h to 50 km/h) to indicate the speed measured in S71 (here, 50 km/h). Meanwhile, the coloring region has a width (here, W3) that is set in S77 according to the acceleration calculated in S76 (in FIG. 11(b) W1<W3, indicating that the speed is increasing in the case illustrated in FIG. 11(b)).

Moreover, the tachometer 22a is displayed such that the coloring region is extended along an outer circumference of the revolution speed scale of the scale panel 24 (from 0 rpm to 2000 rpm) to indicate the revolution speed measured in S72 (here, 2000 rpm). Meanwhile, the coloring region has a width (here, W4) that is set in S77 according to the amount of the change in the revolution speed, the amount calculated in S76 (in FIG. 11(b) W2<W4, indicating that the revolution speed is increasing in the case illustrated in FIG. 11(b)).

After performing the process in S75 or S78, the control section 17 judges whether to cause the display device 1 to stop displaying (S79). This judgment may be made based on whether the driving (moving operation) is ended, i.e., whether the user makes an instruction to stop an engine.

If it is judged that the display is not to be stopped (i.e. if No in S79), the control section 17 repeats the process from the S1. If it is judged that the display is to be stopped (i.e. if Yes in S79), the control section 17 stops the process regarding the display.

As described above, the speed and the revolution speed may be displayed not by using the pointers, but by changing the coloring regions along the scales. Here, the amounts of the changes in the speed and the revolution speed per the given time period(s) may be displayed by changing the widths of the coloring regions.

As to the shape of the scale (scale panel 24), the present invention is not limited to the arrangement in which the shape of the scale (scale panel 24) is in the substantially elliptic shape. For example, the shape of the scale may be circular, straight, rectangular, "chevron"-shape ("<" shape), U-shape, or the like. Moreover, the scale may be displayed with three dimensions rather than two-dimensionally.

Moreover, the present invention is not limited to the arrangement explained above in which the width of the coloring region is changed to indicate the amounts of the changes in the speed and the revolution speed. For example, the amounts of the changes in the speed and the revolution speed may be indicated by changing the shape, color, or the like, of the coloring region.

Furthermore, the coloring region may be displayed by, e.g., combination of lines. For example, the speed and the revolution speed may be displayed by combination of segments of lines on straight lines extended radically from each focus point of the substantially elliptic shape of the scale panel 24. In this case, lengths of the segments are changed in order to indicate the amount of the change in the speed and the revolution speed per the given time period(s).

Moreover, the present invention is not limited to the arrangement explained above in which the speedometer 21a and the tachometer 22a are displayed on the outer side of the scale (along the outer circumference of the scale panel 24). The speedometer 21a and the tachometer 22a may be displayed on an interior side of the scale or on the scale.

Moreover, the present invention is not limited to the arrangement explained above in which the single scale panel 24 is provided for both the speed scale and the revolution speed scale displayed along the scale panel 24. For example, two scale panels (scale lines) may be provided so that the speed meter 21a and the tachometer 22a are displayed respectively on the two scale panels (scales). Moreover, in each of the above-mentioned arrangements, the scale may or may not be displayed with scale marks. The scale may be with scale marking numerals aligned along a line not displayed on a screen. Moreover, the speed and the revolution speed may be digitally displayed respectively in the vicinity of the meters 21*a* and 22*a*. In this case, the scale marking numerals may not be displayed.

Moreover, the coloring regions of the meters 21*a* and 22*a* may be displayed with three dimensions including height changed to indicate the amount of the change in the speed and the revolution speed per the given time period.

Figure 12:
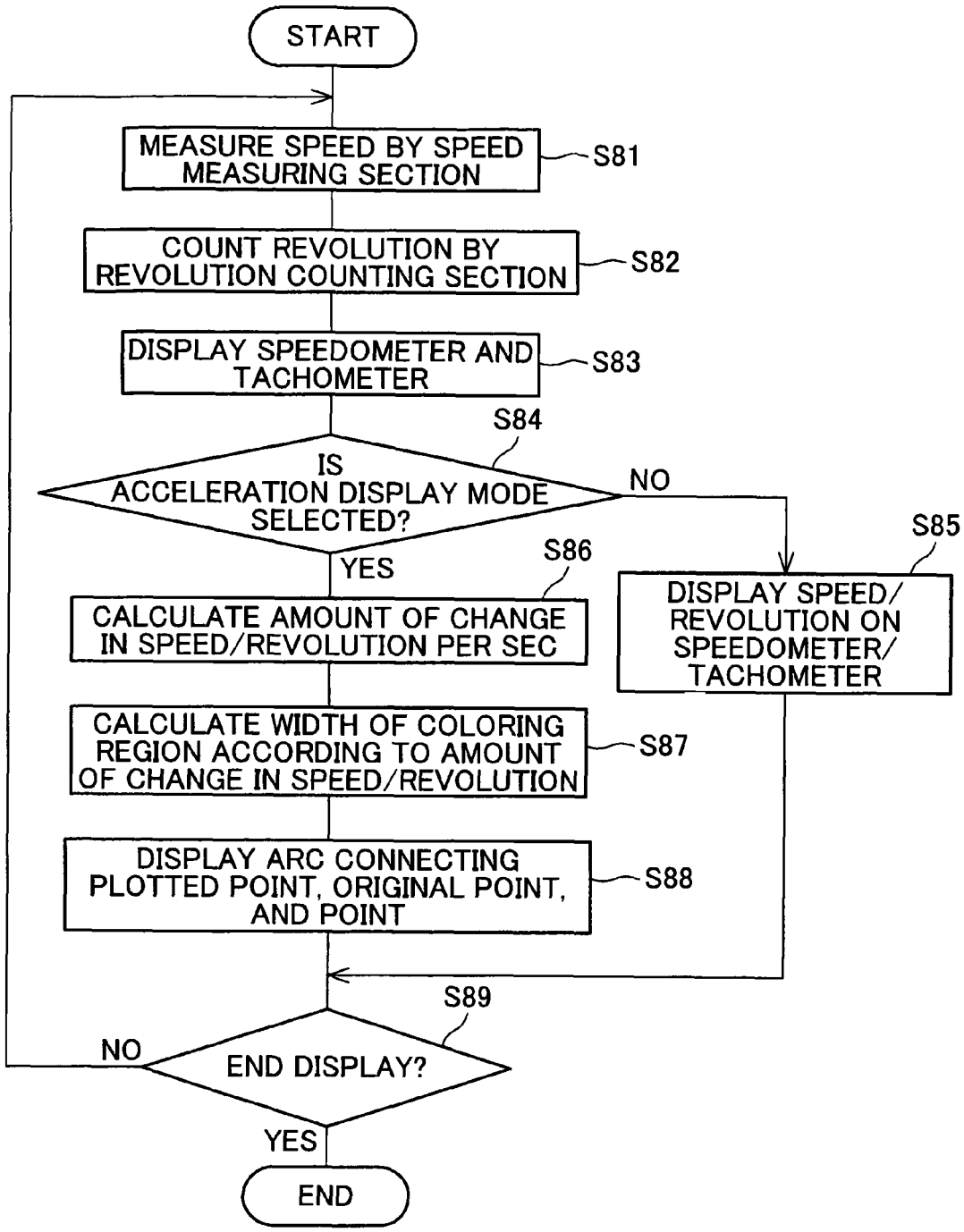
FIG. 12 is a flow chart illustrating still yet another example of the display process of the display device according to the embodiment of the present invention.

FIG. 12 is a flow chart illustrating an example of the process for performing such display.

As illustrated in FIG. 12, the control section 17 (CPU 17*a*) causes the speed measuring section 12 to measure the speed of the vehicle on which they are mounted (S81). Moreover, the control section 17 causes the revolution speed measuring section 17 to measure the revolution speed (S82).

Next, the control section 17 causes the display section 11 to display the speedometer 21*a*, the tachometer 22*a*, and the second speedometer 23 (see FIGS. 13(*a*) and 13(*b*) described later) (S83). More specifically, the control section 17 retrieves, from the parts DB 16, image data of parts for displaying the speedometer 21*a*, tachometer 22*a*, and second speedometer 23, and combines the image data. Then, the control section 17 causes the frame memory 17*b* to store the combined image data temporarily. Next, the control section 17 causes the display section 11 to display the image data stored in the frame memory 17*b*.

Next, the control section 17 judges whether the acceleration display mode is selected or not (S84). Here, the acceleration display mode is a display mode in which the speedometer 21*a* is caused to display the speed and its amount of change per the given time period (i.e. acceleration), and the tachometer 22*a* is caused to display the revolution speed and the amount of its change per the given time period. The present embodiment is arranged such that a user instructs, by using the input section 18, whether to select the acceleration display mode or not. Based on this user's instruction, the control section 17 makes the judgment in S84.

If the acceleration display mode is not selected (if No in S84), the control section 17 selects the normal display mode and causes the speedometer 21*a* and the second speedometer 23 to display the speed measured in S81, and causes the tachometer 22*a* to display the revolution speed (number of the engine revolution speed) measured in S82 (S85). After performing the process of S85, the control section 17 performs process of S89 described later.

FIG. 13(*a*) illustrates an example of the display state (speedometer 21*a*, tachometer 22*a*, and the second speedometer 23) of the display section 11 in the normal display mode.

In the example illustrated in FIG. 13(*a*), a scale panel 24 is displayed in the display section 11. Around the scale panel 24, the speedometer 21*a* and the tachometer 22*a* are displayed.

The explanation of the panel portion 24 is omitted here, because the panel portion 24 is similar to the one illustrated in FIGS. 11(*a*) and 11(*b*).

The speedometer 21*a* is provided along the speed scale of the panel portion 24, and displays the speed by displaying a three-dimensional indicator (image having three dimensions) on the outer side of the speed scale according to the speed to be indicated. For example, in case where 40 km/h is to be indicated as illustrated in FIG. 13(*a*), the three-dimensional indicator is displayed extending from that position of the speed scale which indicates 0 km/h to that position of the speed scale which indicates 40 km/h. In the normal display mode, the three-dimensional indicator has a preset height (here, h3). Here, the three-dimensional indicator is displayed in blue, even though there is no particular limitation in a color of the three-dimensional indicator.

The tachometer 22*a* is provided along the revolution speed scale of the panel portion 24, and displays the revolution speed by displaying a three-dimensional indicator (image having three dimensions) on the outer side of the revolution speed scale according to the speed to be indicated. For example, in case where 2000 rpm is to be indicated as illustrated in FIG. 13(*a*), the three-dimensional indicator is displayed extending from that position of the revolution speed scale which indicates 0 rpm to that position of the speed scale which indicates 2000 rpm. In the normal display mode, the three-dimensional indicator has a preset height (here, h4). Here, the three-dimensional indicator is displayed in red, even though there is no particular limitation in a color of the three-dimensional indicator.

The second speedometer 23 displays the speed measured in S81, similarly to the speedometer 21*a*. As illustrated in FIG. 13(*a*), the second speedometer 23 digitally displays the speed measured in S81.

On the other hand, if the acceleration display mode is selected (if Yes in S84), the control section 17 calculates the amounts of the changes in the speed and the revolution speed (the number of the engine revolution speed) per second (per the given time period(s)) (S86).

Next, the control section 17 converts the amounts of the changes in the speed and the revolution speed per second into the heights of the three-dimensional indicators of the speedometer 21*a* and the tachometer 22*a*, the amount of the changes calculated in S86 (S87). That is, the control section 17 calculates the heights of the three-dimensional indicators of the meters 21*a* and 22*a* according to the amounts of the changes in the speed and the revolution speed, the amounts of the changes calculated in S86. For example, the heights (h3, h4) in the normal display mode are put as heights for constant speed and constant revolution speed, and the heights are changed respectively according to the amounts of the changes. That is, when the speed (or the revolution speed) is increasing, the height of the three-dimensional indicator for the speed (or the revolution speed) becomes higher than h3 (or h4). When the speed (or the revolution speed) is decreasing, the height of the three-dimensional indicator for the speed (or the revolution speed) becomes narrower than h3 (or h4). The heights are increased/decreased respectively in proportion to the amounts of the changes in the speed and the revolution speed per the given time period(s).

Next, the control section 17 causes the speedometer 21*a* and the tachometer 22*a* to be displayed to indicate, with the three-dimensional indicators having the heights calculated in S87, the speed and revolution speed measured in S81 and S82 (S88).

FIG. 13(*b*) illustrates an example of this display state. As illustrated in FIG. 13(*b*), the speedometer 21*a* is arranged such that the three-dimensional indicator is displayed in an area in the outer side of the speed scale of the scale panel, thereby to indicate the speed measured in S81. Here, the three-dimensional indicator is extended from that position of the scale which indicates 0 km/h to that position of the scale which indicates 50 km/h, in order to indicate 50 km/h. Moreover, the three-dimensional indicator has a height (here, h5) calculated in S86 according to the acceleration (h3<h5 in FIG. 13(*b*), indicating that the speed is increasing in FIG. 13(*b*)).

Moreover, the tachometer 22*a* is arranged such that the three-dimensional indicator is displayed in an area in the outer side of the speed scale of the scale panel, thereby to indicate the revolution speed measured in S82. Here, the three-dimensional indicator is extended from that position of the scale which indicates 0 rpm to that position of the scale which indicates 2000 rpm, in order to indicate 2000 rpm. Moreover, the three-dimensional indicator has a height (here, h6) calculated in S86 according to the amount of the change in the revolution speed per the given time period (h4<h6 in FIG. 13(b), indicating that the revolution speed is increasing in FIG. 13(b)).

After performing the process in S85 or S88, the control section 17 judges whether to cause the display device 1 to stop displaying (S89). This judgment may be made based on whether the driving (moving operation) is ended, i.e., whether the user makes an instruction to stop an engine.

If it is judged that the display is not to be stopped (i.e. if No in S89), the control section 17 repeats the process from the S1. If it is judged that the display is to be stopped (i.e. if Yes in S89), the control section 17 stops the process regarding the display.

With this arrangement in which the three-dimensional indicators are used to indicate the speed, revolution speed, and the amounts of their changes, it becomes easier for the driver to grasp the information.

The present invention is not limited to the arrangement the height of each three-dimensional indicator is changed to indicates the amount of the change in the speed and the revolution speed. The amount of the change in the speed and the revolution speed may be displayed by changing a width, shape, and color, of each three-dimensional indicator. Moreover, the amount of the change in the speed and the revolution speed may be displayed by using combination of the height, width, shape, and/or color, of each three-dimensional indicator.

Figure 13A:
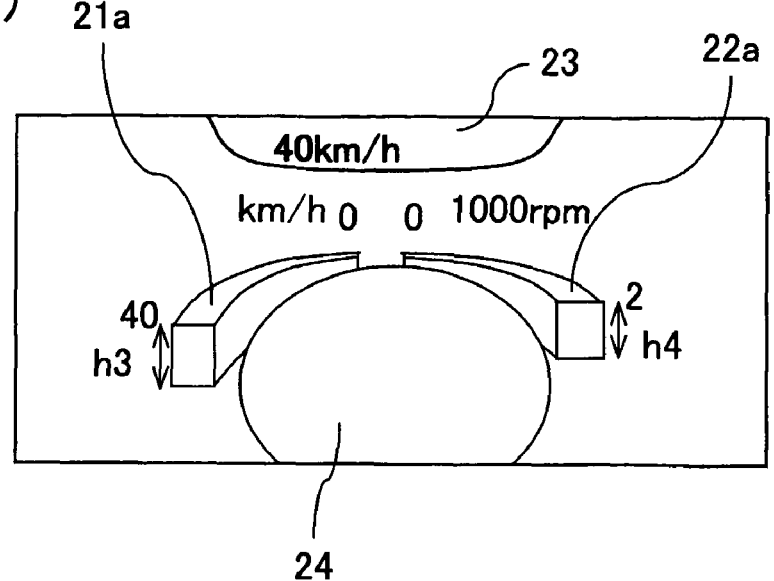
FIG. 13(a) is a view illustrating still yet another example of the normal-display-mode display state of the display device according to the embodiment of the present invention.
Figure 13B:
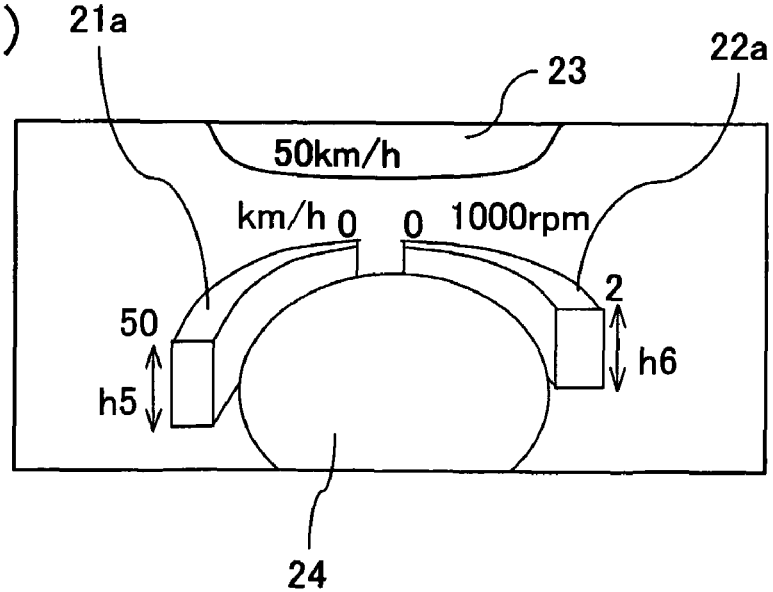
FIG. 13(b) is a view illustrating still yet another example of the acceleration-display-mode display state of the display device according to the embodiment of the present invention.

Moreover, the present invention is not limited to the arrangement illustrated in FIGS. 13(a) and 13(b) in which each of the three dimensional indicators is displayed in one image. The three dimensional indicators may be displayed by using a combination of plurality of parts. In this case, each part may be an image having three dimensions, or the three dimensional indictors may be displayed by using a combination of parts that have two dimensions.

Even though the display section 11 according to the present embodiment displays the speedometer and the tachometer, the present invention is not limited to this. For example, the display section 11 may display only one of the speedometer and tachometer. Moreover, in addition to the speedometer and tachometer the display section 11 may display a meter(s) for indicating another physical amount(s), such as a remaining amount of fuel, a temperature of a coolant, a charge level of a battery, an air pressure of a tire, an oil pressure, an oil temperature, a temperature of an inside of the vehicle, a temperature of an outside of the vehicle, humidity, and the like.

The another meter(s) may indicate the physical amount together with an extent of a change in the physical amount, like the speedometer and the tachometer. That is, what is measured and indicated (i.e. the physical amount to be measured and indicated) is not limited to the speed and revolution speed, even though the above explains the arrangements in which the speedometer indicates the speed and the amount of the change in the speed per the given time period (i.e. acceleration) and the tachometer indicates the revolution speed and the amount of the change in the revolution speed per the given time. The present invention is applicable to indicate any physical amounts that can be expressed quantitative. According to the present invention can indicates any physical amount and an amount of a change in the physical amount per a given time period by using a common meter (meter display, instrument display).

Moreover, the display section 11 may display navigation information, a television picture image, or the like. Moreover, the display section 11 in the present embodiment has the aspect ratio of 7:3. In this case, even though a display region of an aspect ratio of 4:3 (which is equivalent to an aspect ratio of a conventional display device) occupies the display section 11, a square display region of an aspect ratio of 3:3 still remains. Thus, the square display region may be used for displaying meters such as the speedometers, while the remaining display region is used for displaying the navigation information or the like.

The display section 11 is not limited to the aspect ratio of 7:3 in terms of its display region. For example, the display section 11 may have a display region of a smaller or larger aspect ratio.

Moreover, the display region of the display section 11 is not limited to the rectangular shape, and may be, for example, elliptic, circular, trapezoidal, or in the other shape. Moreover, a display surface of the display section 11 may be flat or curved.

The display section 11 is not limited to the liquid crystal panel, even though the display section 11 is a liquid crystal panel in the present invention. For example, the display section 11 may be an organic EL (Electro Luminescence) panel, plasma display panel, CRT (Cathode Ray Tube) display, or the like.

Moreover, the input section 18 is not limited to the arrangement of the present embodiment in which the input section 18 has the plurality of input keys. For example, the display section 11 may function as the input section 18. That is, the display section 11 may be a so-called touch panel, by which an items that a user may input are displayed on the touch panel so as to allow the user to give an instruction to the control section 17 by touching a display region in which the item is displayed. Furthermore, a mouse or a stick-like operation device may be provided as the input section 18. An input section of an audio system or the like may be used as the input section 18. In case where a system for adjusting a side mirror (wing mirror) by electric operation, an operation section of the side mirror may be used as the input section 18. In another case, the input section 18 may be a so-called remote control type, by including (i) an operation input/transmission section for receiving instruction from the user and transmitting instruction information wirelessly via an infra-red ray, a radio wave or the like, and (ii) a receiving section for receiving the instruction information thus transmitted.

Moreover, the vehicle on which the display device 1 is mounted is not limited to an automobile. The vehicle may be a motorcycle, pedal cycle (e.g. bicycle), train, or the other transportation means. The display device can be mounted on any vehicle (transportation means) on which a human embarks, such as a helicopter, an airplane, a vessel, and the like. Moreover, the display device 1 may or may not be mounted on the vehicle fixedly. For example, the display device may be provided to the vehicle detachably.

The present embodiment is arranged such that the revolution speed of the engine (i.e. revolution speed of a revolution driving section) of the automobile on which the display device 1 is provided, and the amount of the change in the revolution speed are measured and displayed. However, the prevent invention is not limited to the engine, as to a device for generating a driving force to be supplied to the vehicle on which the display device 1 is provided. For example, a motor, which converts an electric power to a revolution force may be used as the revolution driving section. In his case, a revolution speed of the motor and an amount of the change in the revolution speed may be measured and displayed.

The device for generating the driving force to be supplied to the vehicle on which the display device 1 is provided may be, for example, a device for a thrust by ejecting air, water, or a combustion gas, a device for generating the driving force by magnetic force. Moreover, the vehicle may move by using human power, a power of an animal such as a horse, cow, dog, or the like, winds, waves, heat, gravity force, or the like.

Moreover, the display device 1 need not be mounted on the vehicle. For example, the vehicle may be provided with a recording section for recording a speed, revolution speed, and their amounts of changes during driving (moving). In this arrangement, information recorded in the recording section is read out to be reproduced by using the display device 1. This allows to find out a timing and maneuvering amount of maneuvering operation during the driving (moving operation) afterward. Moreover, in this arrangement the driving manipulation (moving operation manipulation) during the driving (moving operation) can be easily grasped because the speed and the revolution speed are respectively displayed together with the amounts of their changes. Moreover, in this arrangement, the vehicle may be provided with (i) an image capturing section for capturing an image of a situation outside of the vehicle, and (ii) an image recording section for recording the captured image. With this, the speed, the revolution speed, and the amounts of their changes may be displayed together with the image of the situation outside the vehicle. This allows more realistic reproduction of the situation during the driving (moving operation).

The display device 1 need not be mounted on a vehicle. For example, the display device may be mounted on a driving (moving operation) simulation device (simulator) for simulating the driving (moving operation) of the vehicle. That is, the display device 1 is not limited to the display of the data actually measured by a speed sensor, an engine revolution speed sensor, or the like, but may be used for displaying simulation data inputted therein.

The present invention is not limited to the present invention in which all the processes of the display device 1 is controlled by the control section 17 (CPU17a). Instead of using the control section (CPU17a), the control may be carried out by an information processing device that can read, from a recording medium, a program for performing the processes.

In this arrangement, a processing device (CUP, MPU, or the like) of the information processing device reads out the program stored in the recording medium, thereby to cause the process to be executed.

Here, the information processing device may be an ordinary computer (a work station, personal computer, or the like). A part from the computer, the information processing device may be a function expansion board, a function expansion unit, or the like, which is attached to a computer.

The program is a program code (execute form program, intermediate code program, source program, or the like) of software for realizing the processes. The program may be used solely or in combination with another program (such as OS (operating system)). The program may be temporarily stored in a memory (such as an RAM (Random Access Memory) or the like) in the device after reading out from the recording device, and reread out from the memory thereby to be executed.

The recording medium storing therein the program may be a recording medium that is easily detachable from the information processing device easily, or a recording medium that is fixedly attached (mounted) to the information processing device. Further, the recoding medium may be an external recording apparatus connected to the information device.

Applicable examples of the recording medium are magnetic tapes such as a video tape, cassette tape, and the like; magnetic discs such as floppy (Registered Trademark) discs, hard discs, and the like; optical discs (magneto-optical disc) such as CD-ROM (Compact Disc-Read Only Memory), MO (Magneto-Optical disc), MD (Magnetic Disc), DVD (Digital Vide Disc), CD-R (Compact Disc-Recordable), and the like; memory cards such as IC (Integrated Circuit) cards, optical cards, and the like; semiconductor memories such as mask ROM, EPROM (Electrically Programmable ROM), EEPROM (Electrically Erasable/Programmable ROM), flash ROM, and the like; and the other recording media.

Moreover, the recoding medium may be a recording medium connected with the information processing device via a network (the Interanet, Internet, or the like). In this case, the information processing device obtains the program by downloading the program via the network. That is, the program may be obtained via a transmission medium (a medium holding the program in a flowing manner) such as the network (connected via wire or wirelessly) or the like. In case where the program is transmitted via a communication path (network), a communication medium of various kinds which constitutes the communication path transmits a signal sequence representing the program, thereby to transmit the program via the communication path. Moreover, the transmission of the signal sequence may be carried out in such a manner that a transmitting device modulates a transmission wave with the signal sequence representing the program so as to overlap the signal sequence on a transmission wave. A receiving device demodulates the transmission wave thereby to restore the signal line. The transmission of the signal sequence may be performed in such a manner that a transmitting device divides the signal sequence into packets as digital data sequences. In this case, a receiving device connects the packets thereby to restore the signal sequence. Moreover, the transmission of the signal sequence may be carried out in such a manner that the signal sequence is multiplexed with another signal sequence by time-division multiplexing, frequency-division multiplexing, code-division multiplexing or the like. In this case, a receiving device extracts the signal sequence from the multiplexed signal sequence. In any of these arrangements, similar effect can be attained as long as the program can be transmitted via the communication path. It is preferable that a program for executing the download is stored in advance in the device (in the device from which the program is transmitted or in the device at which the program is received).

The invention being thus described, it will be obvious that the same way may be varied in many ways. Such variations that can be obtained by combination of technical means appropriately modified within the scope of the following claims are not to be regarded as a departure from the technical scope of the invention.

That is, the embodiment and the examples specifically described in the "DETAILED DESCRIPTION OF PREFERRED EMBODIMENTS" are merely to provide clear explanation on the technical content of the present invention. The present invention is not limited to the embodiment and examples and should not be interpreted narrowly according to only the description of the embodiment and examples. Such variations are not to be regarded as a departure from the spirit and scope of the invention.

The present invention is applicable to a display device for displaying a physical amount and an extent of a change in the physical amount (an amount of the change per a given time period). Further, the present invention is applicable to a display device, which can be mounted on any kind of vehicle (transportation means) such as automobiles, motorcycles, bicycles, helicopters, airplanes, vessels, and the other vehicles, and which displays a physical amount such as speed or the like, and an extent of a change in the physical amount.

The invention claimed is:

1. A display device comprising:
 a display section for displaying an image; and
 a control section for controlling the image or images that are to be displayed on the display section,
 each of the image or images being a meter image for indicating a physical amount, and
 the control section causing the meter image to indicate, as well as the physical amount, an amount of a change in the physical amount per a given time period.

2. A display device as set forth in claim 1, wherein:
 the control section changes a shape of the meter image in order to indicate the amount of the change in the physical amount per the given time period.

3. A display device as set forth in claim 1, wherein:
 the meter image comprises a plurality of parts images; and
 the control section changes a shape or shapes of one or more of the parts images in order to indicate the amount of the change in the physical amount per the given time period.

4. A display device as set forth in claim 3, wherein:
 the control section changes a display area or display areas of one or more of the parts images in order to indicate the amount of the change in the physical amount per the given time period.

5. A display device as set forth in claim 3, wherein:
 the meter image includes a pointer image for pointing a position that corresponds to the physical amount that is to be indicated; and
 the control section changes a shape of the pointer image in order to indicate the amount of the change in the physical amount per the given time period.

6. A display device as set forth in claim 3, wherein:
 at least one of the parts image is a three dimension image that is at least partly displayed with three dimensions; and
 the control section changes a length of one of the three dimensions of the three dimension image in order to indicate the amount of the change in the physical amount per the given time period.

7. A display device as set forth in claim 1 wherein:
 the control section changes a color of at least part of the meter image in order to indicate the amount of the change in the physical amount per the given time period.

8. A display device as set forth in claim 1, wherein:
 the meter image comprises a plurality of parts images; and
 the control section changes a color or colors of one or more of the parts images in order to indicate the amount of the change in the physical amount per the given time period.

9. A display device as set forth in claim 1, wherein:
 the control section causes the meter images to respectively indicate the different physical amounts as well as the amounts of changes in the physical amounts per the given time period or the given time periods.

10. A display device as set forth in claim 1, wherein:
 the control section causes the meter image or at least one of the meter images to solely indicate two or more physical amounts and amounts of changes in the physical amounts per a given time period or given time periods.

11. A display device as set forth in claim 10, wherein:
 the meter image or at least one of the meter images comprises a panel portion image, a pointer image, and a three dimension displaying image, the panel portion image being a background image in an interior portion of the meter image, the pointer image displayed on the panel portion image and rotating about a specific position, which acts as an axis of the pointer image, of the panel portion image, and the three dimension displaying image causing the panel portion image to be displayed with three dimensions; and
 the control section changes a point at which the pointer image points, a shape of the pointer image, a shape of the three-dimension displaying image, and a color of at least part of the meter image, in order to cause the meter image or at least one of the meter images to solely indicate two physical amounts and amounts of changes in the two physical amounts per a given time period or given time periods.

12. A display device as set forth in claim 1, comprising:
 a physical amount measuring section for measuring the physical amount; and
 a change amount measuring section for measuring the amount of the change in the physical amount,
 the physical amount and the amount of the change indicated by the meter image being the physical amount and the amount of the change, which are respectively measured by the physical amount measuring section and the change amount measuring section.

13. A vehicle comprising:
 a display device comprising:
 a display section for displaying an image; and
 a control section for controlling the image or images that are to be displayed on the display section,
 each of the image or images being a meter image for indicating a physical amount, and
 the control section causing the meter image to indicate, as well as the physical amount, an amount of a change in the physical amount per a given time period.

14. A vehicle as set forth in claim 13, comprising:
 a speed measuring section for measuring a speed; and
 an acceleration measuring section for measuring an amount of a change in the speed per a given time period,
 the physical amount and the amount of the change indicated by the meter image being the speed and the amount of the change in the speed, which are respectively measured by the speed measuring section and the acceleration measuring section.

15. A vehicle as set forth in claim 13, comprising:
 a revolution driving section for supplying a driving force to the vehicle;
 a revolution speed measuring section for measuring a revolution speed; and
 a revolution speed change amount measuring section for measuring an amount of the change in the revolution speed per a given time period,
 the physical amount and the amount of the change indicated by the meter image being the revolution speed and the amount of the change in the revolution speed, which are measured by the revolution speed measuring section and the revolution speed change amount measuring section.

16. A display method comprising:
 displaying a meter image on a display section for displaying an image, the meter image indicating a physical amount,
 the meter image indicating, as well as the physical amount, an amount of a change in the physical amount per a given time period.

17. A display method comprising:

indicating, on a display device mounted on a vehicle, a speed of the vehicle, the speed indicated by using a speed meter image, which indicates, as well as the speed, an amount of a change in the speed per a given time period.

18. A display method comprising:

indicating, on a display device mounted on a vehicle, a revolution speed of a revolution driving section for supplying a driving force to the vehicle, the revolution speed indicated by using a, tachometer image, which indicates, as well as the revolution speed, an amount of a change in the revolution speed per a given time period.

19. A display program causing, to act as a control section, a computer provided on a display device, which comprises a display section for displaying an image and causes the display section to display a meter image for indicating a physical amount, the control section causing the meter image to indicate, as well as the physical amount, an amount of a change in the physical amount per a given time period.

20. A computer readable recording medium storing therein a display program as set forth in claim 19.

* * * * *